(12) United States Patent
Shiotsu et al.

(10) Patent No.: US 8,587,413 B2
(45) Date of Patent: Nov. 19, 2013

(54) INFORMATION ACCESS SYSTEM, INFORMATION STORAGE DEVICE AND READER/WRITER DEVICE

(75) Inventors: Shinichi Shiotsu, Kawasaki (JP); Isamu Yamada, Kawasaki (JP); Satoshi Inano, Kawasaki (JP); Hideki Tanaka, Kawasaki (JP); Daisuke Yamashita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 923 days.

(21) Appl. No.: 12/433,484

(22) Filed: Apr. 30, 2009

(65) Prior Publication Data
US 2010/0026469 A1   Feb. 4, 2010

(30) Foreign Application Priority Data
Jul. 29, 2008 (JP) .................. 2008-194908

(51) Int. Cl.
*H04Q 5/22* (2006.01)

(52) U.S. Cl.
USPC .......... 340/10.51; 340/13.2; 340/13.27; 340/13.33; 340/10.1; 340/10.4

(58) Field of Classification Search
USPC ..................................... 340/10.51
See application file for complete search history.

(56) References Cited

U.S. PATENT DOCUMENTS

| | | | |
|---|---|---|---|
| 5,335,356 A | 8/1994 | Andersson | |
| 5,392,223 A | 2/1995 | Caci | |
| 5,754,837 A * | 5/1998 | Walsh et al. | 713/500 |
| 5,774,459 A * | 6/1998 | Charrat | 370/310 |
| 5,945,944 A | 8/1999 | Krasner | |
| 6,323,566 B1 * | 11/2001 | Meier | 307/10.2 |
| 6,363,566 B1 * | 4/2002 | Collins | 15/104.05 |
| 2004/0201457 A1 * | 10/2004 | O'Toole et al. | 340/10.33 |
| 2006/0187044 A1 * | 8/2006 | Fabian et al. | 340/572.1 |

(Continued)

FOREIGN PATENT DOCUMENTS

| | | |
|---|---|---|
| JP | 6-188803 | 7/1994 |
| JP | 6-225266 | 8/1994 |

(Continued)

OTHER PUBLICATIONS

Japanese Office Action for application No. 2008-194908 issued Nov. 27, 2012.

(Continued)

*Primary Examiner* — George Bugg
*Assistant Examiner* — Anthony D Afrifa-Kyei
(74) *Attorney, Agent, or Firm* — Staas & Halsey LLP

(57) ABSTRACT

An information access system includes a reader/writer device and an information storage device. In the information storage device, a receiver unit senses a carrier of an RF signal at a first frequency for detection, in a first time period occurring at time intervals, and receives an information request signal in response to detection of a carrier of an RF signal at the first frequency, and senses a carrier of an RF signal at a second frequency in response to reception of the information request signal. In the storage device, a control causes the receiver unit to sense a carrier of an RF signal at the first frequency for detection, in a second time period after a sleep time period which is shorter than the time interval, in response to non-detection by the receiver unit of a carrier of an RF signal at the first frequency in the first time period.

10 Claims, 15 Drawing Sheets

(56) References Cited

U.S. PATENT DOCUMENTS

| | | |
|---|---|---|
| 2006/0276206 A1 | 12/2006 | Shiotsu et al. |
| 2008/0068156 A1 | 3/2008 | Shimokawa et al. |
| 2008/0180253 A1* | 7/2008 | Ovard et al. ............... 340/572.4 |
| 2008/0188253 A1* | 8/2008 | Chong et al. ................ 455/504 |
| 2010/0085161 A1* | 4/2010 | Nishikawa ................... 340/10.3 |

FOREIGN PATENT DOCUMENTS

| | | |
|---|---|---|
| JP | 9-114539 | 5/1997 |
| JP | 2000-501515 | 2/2000 |
| JP | 2000-242742 | 9/2000 |
| JP | 2001-505665 | 4/2001 |
| JP | 2002-541893 | 12/2002 |
| JP | 2002-542470 | 12/2002 |
| JP | 2003-529050 | 9/2003 |
| JP | 2004-517574 | 6/2004 |
| JP | 2004-531136 | 10/2004 |
| JP | 2005-510115 | 4/2005 |
| JP | 2005-315820 | 11/2005 |
| JP | 2005-536126 | 11/2005 |
| JP | 2006-500882 | 1/2006 |
| JP | 2006-520132 | 8/2006 |
| JP | 2006-524472 | 10/2006 |
| JP | 2006-338489 | 12/2006 |
| JP | 2007-41844 | 2/2007 |
| JP | 2007/171210 | 7/2007 |
| JP | 2007-521474 | 8/2007 |
| JP | 2007-524459 | 8/2007 |
| JP | 2007-533224 | 11/2007 |
| JP | 2008-504185 | 2/2008 |
| JP | 2008-072414 | 3/2008 |
| JP | 2008-131490 | 6/2008 |
| WO | 98/16849 | 4/1998 |
| WO | 98/25158 | 6/1998 |
| WO | 00/62664 | 10/2000 |
| WO | 00/63646 | 10/2000 |
| WO | 01/16554 A2 | 3/2001 |
| WO | 02/054820 A2 | 7/2002 |
| WO | 02/091765 A2 | 11/2002 |
| WO | 03/043210 A1 | 5/2003 |
| WO | 2004/016034 A1 | 2/2004 |
| WO | 2004/028086 A2 | 4/2004 |
| WO | 2004/081602 A2 | 9/2004 |
| WO | 2004/092762 A1 | 10/2004 |
| WO | 2004/110079 A2 | 12/2004 |
| WO | 2005/002663 A2 | 1/2005 |
| WO | 2005/101882 A1 | 10/2005 |
| WO | 2006/083265 A2 | 8/2006 |
| WO | 2008/072301 A1 | 6/2008 |

OTHER PUBLICATIONS

European Search Report dated May 4, 2011 in corresponding European Patent Application 09158488.8.

* cited by examiner

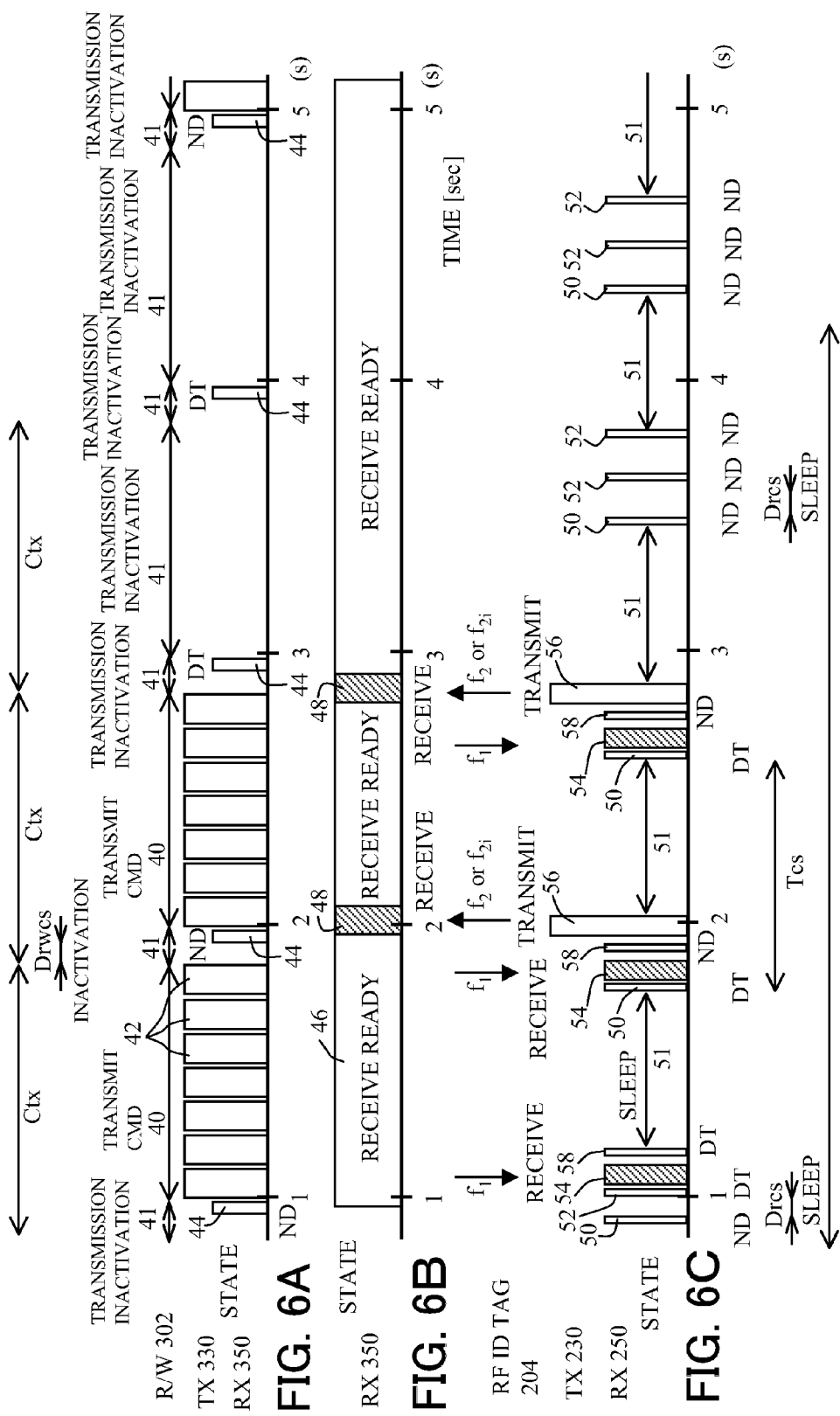

INFORMATION ACCESS SYSTEM, INFORMATION STORAGE DEVICE AND READER/WRITER DEVICE

CROSS-REFERENCE TO RELATED APPLICATION

This application is based upon and claims the benefit of priority of the prior Japanese Patent Application No. 2008-194908, filed on Jul. 29, 2008, the entire content of which is incorporated herein by reference.

FIELD

A certain aspect of the embodiments discussed herein is related generally to an information storage device, and in particular to a system including a reader/writer device and an information storage device to and from which the reader/writer device can transmit and receive RF signals.

BACKGROUND

An RF ID tag with a battery power supply or of an active type, which may be attached to a merchandise article or the like, or carried by a person, transmits an RF signal at a transmission frequency that carries an ID and other information related to the article or the person, so that the RF signal is received and the information is read out by a reader device. The read-out information is further processed by a computer or the like, so that the distribution of the article or the action of the person is monitored and managed. The active-type RF ID tag with battery power supply has a larger communication range than a passive-type RF ID tag that receives power from a reader/writer device in a contactless manner, and hence is practical in use. There is an improved active-type RF ID tag that responds only to a tag ID request transmitted by the reader/writer device.

A known information access system accesses information stored in an active-type contactless information storage device such as an RF ID tag. In such an information access system, a reader/writer device continually transmits an ID request signal at a first frequency and is continuously ready to receive an RF signal at a second frequency. The active-type contactless information storage device includes a receiver unit for sensing a carrier of an RF signal at the first frequency, and a transmitter unit for transmitting a response RF signal at the second frequency when the ID request signal is received. The receiver unit senses a carrier of an RF signal at the first frequency in carrier sensing periods occurring in a carrier sensing cycle. When the receiver unit detects a carrier of an RF signal at the first frequency in a particular carrier sensing period, the receiver unit receives the ID request signal, and the transmitter unit transmits a response RF signal at the second frequency carrying an ID. In the carrier sensing, the control unit causes the receiver unit to be in an active state and the transmitter unit to be in an inactive state in the particular carrier sensing periods. When the receiver unit attempts to sense a carrier of the RF signal at the first frequency in the particular carrier sensing period but detects no carrier, the control unit controls the receiver unit and the transmitter unit to maintain the inactive state during a non-carrier sensing period between the particular carrier sensing period for carrier sensing and the subsequent carrier sensing period for subsequent carrier sensing. Thus, the power consumption of the active-type contactless information storage device may be decreased.

SUMMARY

According to an aspect of the embodiment, an information access system includes a reader/writer device and an information storage device. The reader/writer device includes a first memory, a first timing generator for measuring time, a first transmitter unit for transmitting an information request signal at a first frequency in a transmission time period, a first receiver unit for receiving a response signal at a second frequency which is different from the first frequency, and a first control for causing the first transmitter unit to suspend its transmission in a non-transmission time period. The information storage device includes a second memory for storing an identification, a second timing generator for measuring time, and a battery. The information storage device further includes a second receiver unit for sensing a carrier of an RF signal at a first frequency for detection, in a first time period occurring at time intervals, and further receiving the information request signal in response to detection of a carrier of an RF signal at the first frequency, and for sensing a carrier of an RF signal at the second frequency in response to reception of the information request signal. The information storage device further includes a second control for causing the second receiver unit to sense a carrier of an RF signal at the first frequency for detection, in a second time period after a sleep time period which is shorter than the time interval, in response to non-detection by the second receiver unit of a carrier of an RF signal at the first frequency in the first time period. The information storage device further includes a second transmitter unit for transmitting the response signal at the second frequency in response to non-detection by the second receiver unit of a carrier of an RF signal at the second frequency in the first time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6A illustrates a time chart of a transmission inactivation time period, carrier sensing at a transmission frequency, and processing for transmission of an RF signal carrying a tag information request command, in the reader/writer device, FIG. 6B illustrates a time chart of a receive ready state and of processing for reception of a received RF signal in the reader/writer device, and FIG. 6C illustrates a time chart of carrier sensing of received RF signals, carrier sensing of a transmitted RF signal, processing for reception of received RF signals, and processing for transmission of an RF signal carrying a response, in the active-type RF ID tag;

DESCRIPTION OF EMBODIMENTS

Figure 1:
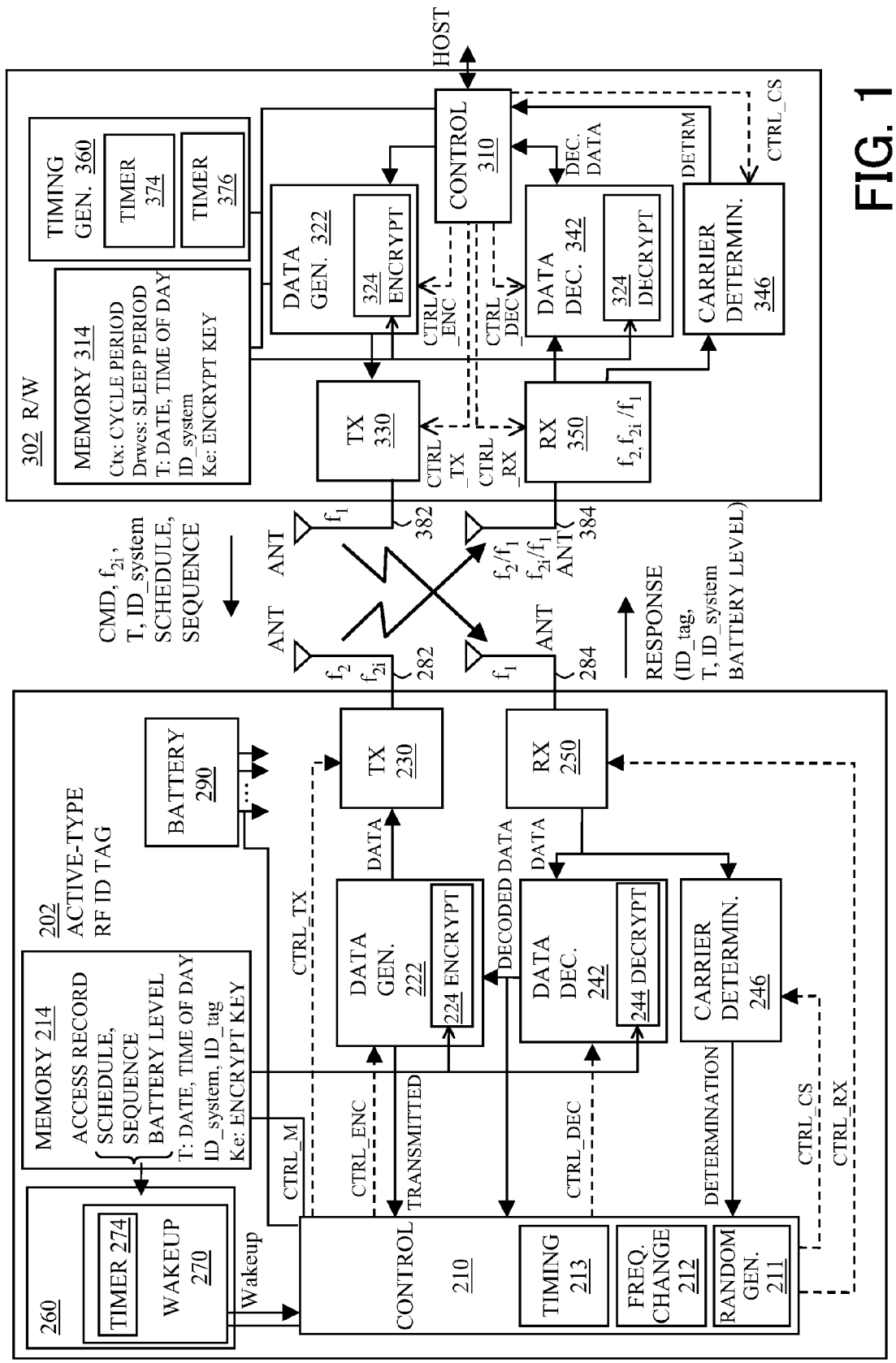
FIG. 1 illustrates configurations of an active-type RF ID tag as an active-type contactless information storage device and of a reader/writer device.

When a reader/writer device has a low output power for transmitting an RF signal so that the RF signal is transmitted and received in a short range, the reader/writer device can transmit and receive an RF signal to and from an active-type RF ID tag without interference with an RF signal transmitted by another reader/writer device. However, when a reader/writer device has a higher output power for transmitting an RF signal so that the RF signal is transmitted and received in a longer range, the RF signal transmitted by the reader/writer may interfere with another RF signal transmitted by another reader/writer deice in the vicinity. Thus, it may be desirable that a reader/writer device is adapted to cyclically suspend its transmission of the RF signal, then sense a carrier of another RF signal at a transmission frequency transmitted by another reader/writer device, and then restart the transmission of the RF signal only when it detects no carrier at the transmission frequency.

The inventors have recognized that, while the reader/writer device suspends the transmission of an RF signal in order to avoid interference with another RF signal, an active-type RF ID tag which is located near the reader/writer device cannot detect a carrier of the RF signal from the reader/writer device.

The inventors have also recognized that, if the RF ID tag is adapted to continue to sense a carrier until it detects an RF signal while the reader/writer device suspends its transmission of an RF signal, then the power consumption of the RF ID tag may undesirably increase.

The inventors have further recognized that an RF ID tag may be adapted to repeat the carrier sensing in a short cycle up to a maximum number of times while the RF ID tag does not detect an RF signal transmitted by a reader/writer device, so that it may reliably detect an RF signal transmitted by the reader/writer device while the power consumption of the RF ID tag is minimized.

The inventors have recognized that the RF ID tag may be adapted to cyclically sense a carrier at a transmission frequency before it transmits an RF signal at the transmission frequency, so that it transmits the RF signal when it detects no such carrier, but it inhibits the transmission of an RF signal when it detects such a carrier, which may reduce the probability of interference of such an RF signal with another RF signal transmitted by another RF ID tag.

It is an object in one aspect of the embodiment to provide an information storage device capable of reliably detecting an RF signal which may be transmitted intermittently by another device.

It is another object in another aspect of the embodiment to provide an information storage device capable of reliably transmitting an RF signal with a reduced probability of interference with an RF signal transmitted by another device.

According to the aspects of the embodiment, an information storage device can detect an RF signal reliably which may be transmitted intermittently by another device, and can reliably transmit an RF signal with a reduced probability of interference with an RF signal transmitted by another device.

Non-limiting preferred embodiments of the present invention will be described with reference to the accompanying drawings. Throughout the drawings, similar symbols and numerals indicate similar items and functions.

FIG. 1 illustrates configurations of an active-type RF ID tag 202 as an active-type contactless information storage device and of a reader/writer device 302.

The configurations of the active-type RF ID tag 202 and the reader/writer device 302 are modifications of those disclosed in Japanese Laid-open Patent Application Publication No. JP 2006-338489, and corresponding US Patent Application Publication No. 2006/276206 A1, the entire contents of which are incorporated herein by reference.

As an active-type contactless information storage device, a contactless IC card having a configuration similar to that of the active-type RF ID tag 202 may be used in place of the active-type RF ID tag 202. In FIG. 1, data transmitted between the RF ID tag 202 and the reader/writer device 302 is encrypted, and the transmitted data is received and decrypted for authentication. Alternatively, authentication may not be performed for the received data, and the transmitted data may not be encrypted.

The active-type RF ID tag 202 includes a control unit 210, a memory 214, a data generation unit 222, a transmitter unit (TX) 230, a receiver unit (RX) 250, a data decoding unit 242, a carrier determination unit 246, a timing generator unit 260, a transmitting antenna (ANT) 282, a receiving antenna (ANT) 284, and a battery 290. The timing generator unit 260 includes a wakeup unit 270.

The wakeup unit 270 includes a timer 274 which measures time and thereby generates a date and a time of day. The wakeup unit 270 is constantly in an active state after the power activation of the RF ID tag 202. In accordance with the date and the time of day of the timer 274 and with the control schedule and the time control sequence read out from the memory 214 and set up beforehand, the wakeup unit 270 provides a wakeup signal to the control unit 210 in a carrier sensing cycle Tcs for sensing a carrier, for example, of two seconds. The control unit 210 corrects the date and time of day of the timer 274 in accordance with the current date and time of day information T in the memory 214, and then writes and updates the current date and time of day T generated by the timer 274 in the memory 214.

The data generation unit 222 generates data in a format including the tag ID (ID_tag) stored in the memory 214 and the like, encrypts the generated data in accordance with a given cryptosystem, then encodes the encrypted data in accordance with a given encoding scheme, and then provides the encoded data to the transmitter unit 230. The data may include the remaining battery power level and the access records. The transmitter unit (TX) 230 modulates a carrier with the encoded data of a baseband received from the data generation unit 222, and then transmits an RF signal at a frequency $f_2$ or RF signals at different frequencies $f_{2i}$ (i=1, 2, ..., n).

The receiver unit (RX) 250 receives and demodulates an RF signal at a reception frequency $f_1$, to thereby reproduce baseband encoded data, and also generates data indicative of the carrier intensity of the received RF signal.

The carrier determination unit 246 receives, from the receiver unit 250, the data indicative of the power intensity of the received RF signal carrier, and accordingly determines the presence or absence of a received carrier. The carrier determination unit 246 then provides the resultant determination to the control unit 210.

The data decoding unit 242 decodes the received encoded data in accordance with the encoding scheme, and decrypts the decoded data in accordance with the cryptosystem to thereby generate decrypted data. The data decoding unit 242 then provides the decrypted data to the data generation unit 222 and to the control unit 210.

The frequencies $f_1$ and $f_2$ may be 951 MHz and 955 MHz, respectively, for example. The frequencies $f_{2i}$ may be 955 MHz, 956 MHz, ..., 960 MHz, for example. The transmission output power of the transmitter unit (TX) 230 may be one (1) mW, for example.

The transmitting antenna (ANT) 282 is coupled to the transmitter unit 230. The receiving antenna (ANT) 284 is coupled to the receiver unit 250. Alternatively, the antennas 282 and 284 may be composed of a single antenna.

The battery 290 supplies power to the elements 210-270 and the like of the RF ID tag 202.

The control unit 210 includes a random number generator 211, a frequency changing unit 212, and a timing unit 213. The random number generator 211 generates a random number for selecting one of time slots for transmission. The frequency changing unit 212 changes the transmission and reception frequency $f_{2i}$. The timing unit 213 adjusts a timing for transmission.

The control unit 210 is constantly in an active state after power activation of the RF ID tag 202. The control unit 210 provides a memory control signal CTRL_M, a data generation control signal CTRL_ENC, and a transmission control signal CTRL_TX to the memory 214, the data generation unit 222, and the transmitter unit 230, respectively. The control unit 210 further provides a reception control signal CTRL_RX, and a data decoding control signal CTRL_DEC to the receiver unit 250, and the data decoding unit 242, respectively. The control unit 210 further provides a carrier determination control signal CTRL_CS and a timing-generator or wakeup-unit control signal, to the carrier determination unit 246 and the wakeup unit 270, respectively. The control unit 210 may be a microprocessor or microcomputer that operates in accordance with a stored program.

The memory 214 may store information, such as the tag ID (ID_tag) of the RF ID tag 202, a system ID (ID_system) and an encryption/decryption key Ke for authentication, the current date and time-of-day information T, and records of accesses performed by the reader/writer device 302. The memory 214 may store further information, such as a control schedule and a time control sequence of the wakeup unit 270, the current remaining power level of the battery 290, a cycle period Tcs for sensing a carrier of a received RF signal, a time period or duration of carrier sensing, a time period of processing for reception, and a time period of processing for transmission. The memory 214 provides the current date and time-of-day information T, the system ID and the encryption/decryption key Ke to the data generation unit 222 and the data decoding unit 242.

These pieces of information are transmitted to the RF ID tag 202 by the reader/writer device 302 beforehand, and then written into the memory 214 by the control unit 210 beforehand. These pieces of information in the memory 214 are stored and updated under the control of the control unit 210.

The system ID is indicative of a common ID shared by a group of the reader/writer device 302 and a plurality of RF ID tags including the RF ID tag 202. The system ID may be an ID of the reader/writer device 302.

The data generation unit 222 includes an encryption unit 224, which encrypts the data to be transmitted, with the encryption key Ke stored in the memory 214 in accordance with the cryptosystem. The data decoding unit 242 includes a decryption unit 244, which decrypts the received data with the encryption/decryption key Ke in accordance with the cryptosystem. The common key cryptosystem is employed as the cryptosystem herein. Alternatively, the public key cryptosystem may be employed.

The reader/writer device 302 includes a control unit 310, a memory 314, a data generation unit 322, a transmitter unit (TX) 330, a receiver unit (RX) 350, a data decoding unit 342, a carrier determination unit 346, a timing generator unit 360, a transmitting antenna (ANT) 382, and a receiving antenna (ANT) 384.

The control unit 310 transmits and receives data to and from a host computer (not illustrated). The data generation unit 322 generates data in a format including a command (CMD) and the like received from the control unit 310. The data generation unit 322 then encrypts the generated data, and then encodes the encrypted data, to thereby generate encoded data.

The transmitter unit (TX) 330 transmits an RF signal continually or intermittently. In the time period of processing for transmission, the transmitter unit (TX) 330 modulates the carrier with the encoded data of a baseband received from the data generation unit 322, and then transmits an RF signal at the frequency $f_1$. The transmission output power of the transmitter unit (TX) 330 may be 100 mW, for example.

The receiver unit (RX) 350 includes a receiver for receiving an RF signal at the reception frequency $f_2$ or frequencies $f_{21}$ to $f_{2n}$, and another receiver for receiving an RF signal at the transmission frequency $f_1$ from the reader/writer device 302. Alternatively, the receiver unit 350 may be not provided with such another receiver for receiving an RF signal at the frequency $f_1$, and the transmitter unit 330 may be replaced with a transceiver unit that includes the transmitter unit for transmitting an RF signal at the frequency $f_1$, and such another receiver for receiving an RF signal at the frequency $f_1$. In this case, the receiver for receiving an RF signal at the frequency $f_1$ in the transceiver unit is activated, instead of activating the receiver for receiving an RF signal at the frequency $f_1$ in the receiver unit 350.

The carrier determination unit 346 receives, from the receiver unit 350, the data indicative of the power intensity of the received RF signal carrier at the transmission frequency $f_1$, and determines the presence or absence of a received RF signal carrier in accordance with the intensity data. The carrier determination unit 346 then provides the resultant determination to the control unit 310.

The data decoding unit 342 decodes the encoded data received from the receiver unit 350 to thereby generate baseband decoded data, and then decrypts the decoded data. The receiver unit 350 then provides the decrypted data to the control unit 310.

In accordance with a preset time control sequence, the timing generator unit 360 measures time, generates time information, and generates an inactivation timing, a carrier sensing timing, and a transmission timing. The timing generator unit 360 has a cycle period timer 374 as well as an inactivation or delay timer 376 for preventing a transmitted RF signal from interference.

The transmitting antenna (ANT) 382 is coupled to the transmitter unit 330. The receiving antenna (ANT) 384 is coupled to the receiver unit 350. Alternatively, the antennas 382 and 384 may be composed of a single antenna.

The memory 314 stores information, such as the current date and time-of-day information T for authentication, the system ID (ID_system) for authentication, an encryption/decryption key Ke, an operation cycle period Ctx, a transmission time period, an inactivation time period Drwcs, and a carrier sensing time period. The data generation unit 322 includes an encryption unit 324, which encrypts the data to be transmitted, with the encryption key Ke stored in the memory 314 in accordance with the cryptosystem. The data decoding unit 342 includes a decryption unit 344, which decrypts the received data with the encryption/decryption key Ke in accordance with the cryptosystem.

When the control unit 310 receives a command such as a tag ID or information request command (often referred to simply as a tag information request command hereinafter) from the host computer, it provides data including the command to the data generation unit 322. The data may include the transmission frequency $f_2$ or $f_{2i}$ to be used in the RF ID tag 202, the reference current date and time-of-day information T, and a control schedule and a time control sequence, sleep periods of time, a count value, and the like, which are new or updated. The command may include an instruction of correcting or updating the time of the timer 274, in addition to the current date and time-of-day information T. Further, the command may include an instruction of correcting or updating the schedule or the sequence stored in the memory 214, in addition to the control schedule or the time control sequence which are new or updated.

Figure 2:
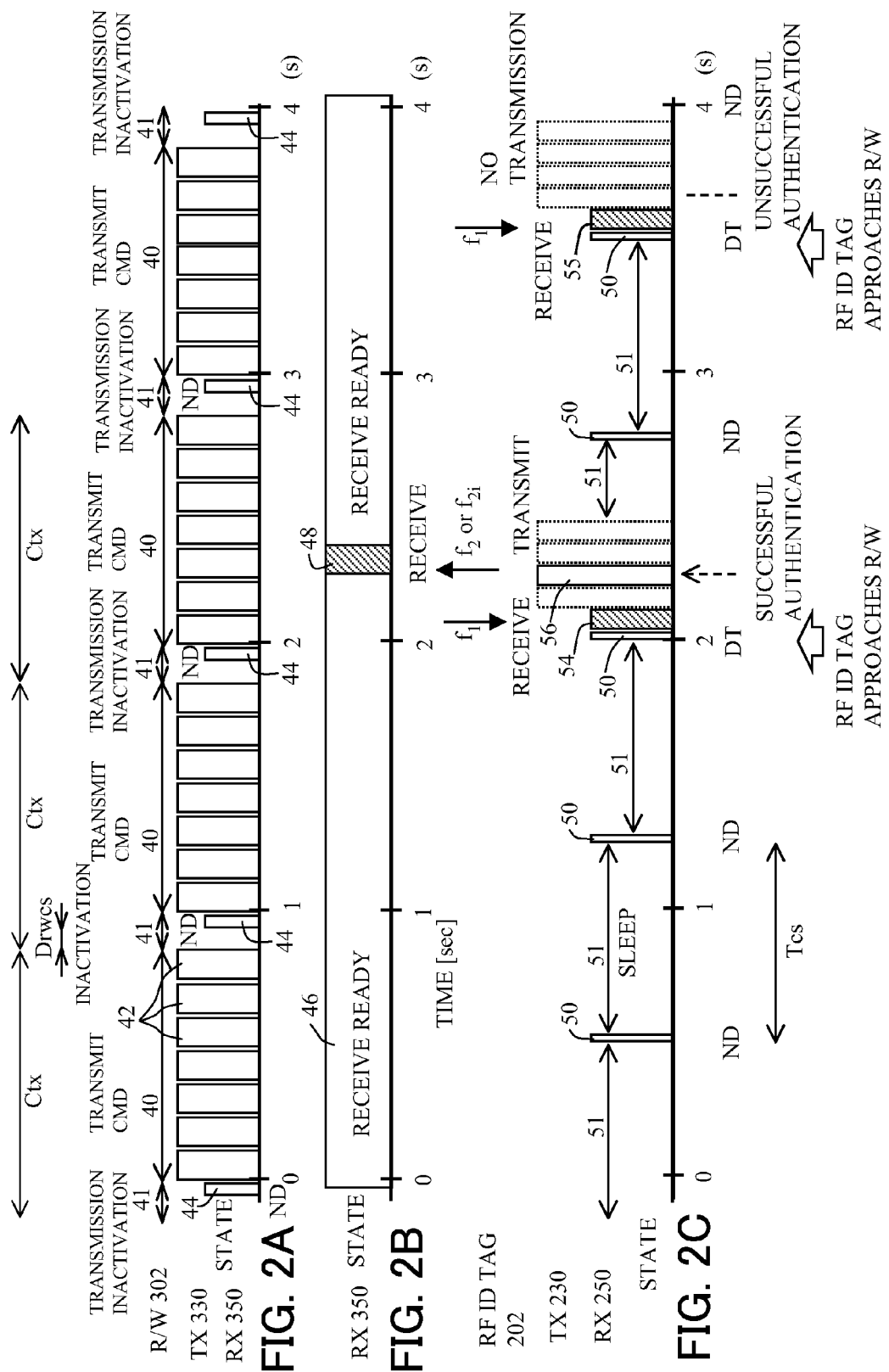
FIG. 2A illustrates a time chart of processing for transmission of an RF signal carrying a tag information request command (CMD) transmitted from the reader/writer device.
FIG. 2B illustrates a time chart of a receive ready state and of processing for reception of a received RF signal in the reader/writer device.
FIG. 2C illustrates a time chart of carrier sensing, processing for reception of received RF signals, and processing for transmission of an RF signal carrying a response in the case of successful authentication, in the active-type RF ID tag.

FIG. 2A illustrates a time chart of a transmission inactivation or disabled time period 41, carrier sensing 44 for the transmission frequency $f_1$, and processing for transmission 42 of an RF signal carrying a tag information request command (CMD), in the reader/writer device 302. FIG. 2B illustrates a time chart of a receive ready state 46 and of processing for reception 48 of a received RF signal in the reader/writer device 302. FIG. 2C illustrates a time chart of carrier sensing 50, processing for reception 54 and 55 of received RF signals, and processing for transmission 56 of an RF signal carrying a response in the case of successful authentication, in the active-type RF ID tag 202.

Referring to FIG. 2A, the data generation unit 322 of the reader/writer device 302 generates data including a tag information request command for the RF ID tag that is received from the control unit 310. The data generation unit 322 then encrypts the data, and encodes the encrypted data to thereby generate encoded encrypted data.

In the transmission inactivation or disabled time period 41, the transmitter unit 330 suspends its transmission of an RF signal at the frequency $f_1$, and the receiver unit 350 senses a carrier at the transmission frequency $f_1$ in the time period of carrier sensing 44 with a particular duration, for example of approximately 1-10 ms, after the elapse of a particular inactivation time period Drwcs (e.g., 100 ms).

When no carrier is detected in the time period of carrier sensing 44, the transmitter unit 330 cyclically transmits the RF signal carrying the command in the successive time slots in the processing for transmission 42, during the remaining transmission period of time 40 within the cycle period Ctx. On the other hand, when a carrier is detected in the time period of carrier sensing 44, the control unit 310 inhibits the transmitter unit 330 from transmitting the RF signal in the remaining time period within the cycle period Ctx, so that the transmission inactivation time period 41 is continued. This may prevent possible interference between the RF signal at the frequency $f_1$ to be transmitted from the reader/writer 302 and another transmitted RF signal at the frequency $f_1$ from another reader/writer device and the like.

Referring to FIG. 2C, in the active-type RF ID tag 202, in response to a wakeup signal from the wakeup unit 274, the control unit 210 enables the receiver unit 250 and the carrier determination unit 246 in the periods of time for carrier sensing 50 with a particular duration, for example of approximately 1-10 ms, occurring in a preset cycle Tcs, for example of 0.8 seconds. This causes the receiver unit 250 to enter into a receive ready state. Then the enabled carrier determination unit 246 determines the presence or absence of a received carrier, in accordance with the data received from the receiver unit 250 indicative of the power intensity of the carrier of the received RF signal at the frequency $f_2$ or $f_{2i}$ from the receiver unit 250.

When the RF ID tag 202 is not located near the reader/writer device 302, or when the reader/writer device 302 suspends its transmission of the RF signal, the carrier determination unit 246 of the RF ID tag 202 detects no carrier (ND), and hence determines the absence of a carrier.

In a period of time 51 intervening between two adjacent carrier sensing time periods 50, the RF ID tag 202 enters into a sleep mode of operation, during which only the control unit 210 and the timing generator unit 260 (including the wakeup unit 270) are enabled or powered on, while the other elements 214-250 are disabled or powered down. The time length of the sleep period of time 51 may be shorter than the length of time between the ending time of a carrier sensing time period 50 and the starting time of the next carrier sensing time period 50.

When the RF ID tag 202 approaches the reader/writer device 302 so that the receiver unit 250 of the RF ID tag 202 receives an RF signal, the carrier determination unit 246 detects the carrier of the RF signal (DT) in the time period for carrier sensing 52, and hence determines the presence of a carrier.

In response to the resultant determination of the presence of a carrier, the receiver unit 250 and the data decoding unit 242 are enabled in the time period of the subsequent processing for reception 54 with a particular duration, for example, of 100 ms.

The enabled receiver unit 250 receives and demodulates the RF signal to thereby reproduce encoded encrypted data including a command. The enabled data decoding unit 242 decodes the data, then decrypts the decoded data, then obtains the command from the data, and then provides the command to the control unit 210.

The control unit 210 authenticates the reader/writer device 302 in accordance with the date and time-of-day information T and the system ID included in the command. When the authentication has been successful, the control unit 210 enables, in response to the command, the data generation unit 222 and the transmitter unit 230 in a time period or slot of processing for transmission 56 selected at random within a given period of time, each time slot having a particular duration (e.g., 100 ms).

The enabled data generation unit 222 encrypts data including desired information, such as the tag ID (ID_tag), the date and time-of-day information T, the system ID (ID_system) and the like retrieved from the memory 214, and then encodes the encrypted data. The desired information may include other information, such as commodity contents of a package and the number and state of the content items, a sender, transportation, a route and a destination. The enabled transmitter unit 230 modulates the carrier with the encoded response data including the tag ID for transmitting the RF signal carrying the response data.

On the other hand, when the authentication has been unsuccessful, the processing is terminated without generating or transmitting the data.

Referring to FIG. 2B, the receiver unit 350 of the reader/writer device 302 is constantly in the receive ready state 46. When the RF ID tag 202 approaches the reader/writer device 302 so that the receiver unit 350 receives an RF signal, the receiver unit 350 demodulates the received RF signal in the time period of processing for reception 48, and then reproduces encoded encrypted data.

The data decoding unit 342 decodes the encoded encrypted data, then decrypts the decoded encrypted data to thereby reproduce the response data including the tag ID, and then provides the reproduced response to the control unit 310.

In response to the received and reproduced response, the control unit 310 authenticates the RF ID tag 202 in accordance with the date and time-of-day information T and the system ID included in the response, and then provides the tag ID and other information to the host computer.

The host computer processes the tag ID for use in monitoring and managing the article distribution or the persons.

In general, the total time during which the RF ID tag 202 is not located near the reader/writer device 302 is much longer than the time during which the RF ID tag 202 is located near the reader/writer device 302. Thus, the active-type RF ID tag 202 is in a sleep mode of operation for the most period of time.

This may significantly reduce the power consumption of the active-type RF ID tag 202, and hence may significantly increase the run time of the battery 290.

In general, when the reader/writer device 302 and the RF ID tag 202 encrypt the data to be transmitted and perform mutual authentication in accordance with the date and time-of-day information T and the system ID, the data transmitted by the reader/writer device 302 and the RF ID tag 202, which may be intercepted by a third party, has little risk of being decrypted and used improperly. This may enhance the security of the reader/writer device 302 and the RF ID tag 202.

Figure 3:
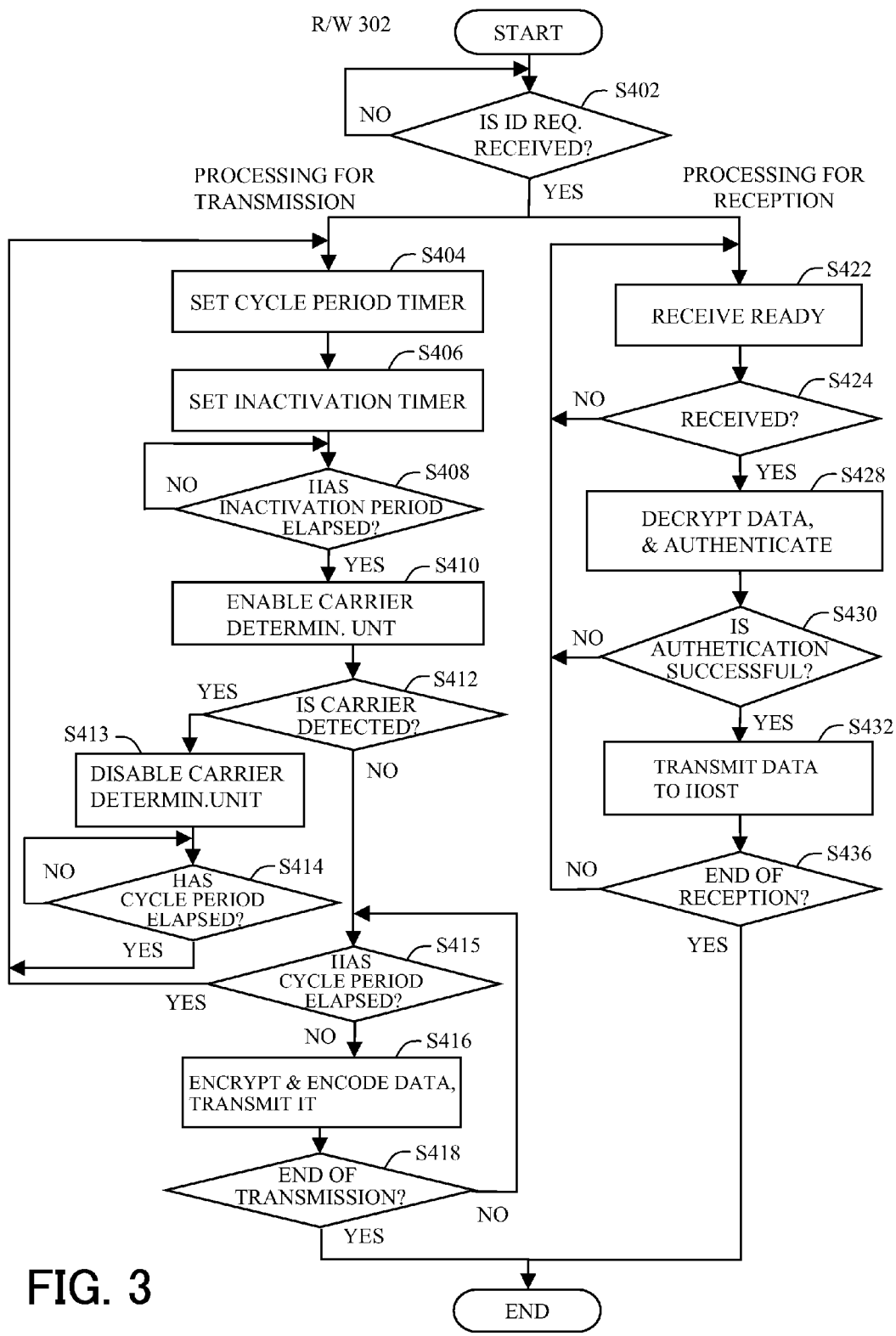
FIG. 3 illustrates a flow chart for the processing performed by the reader/writer device.
Figure 4A:
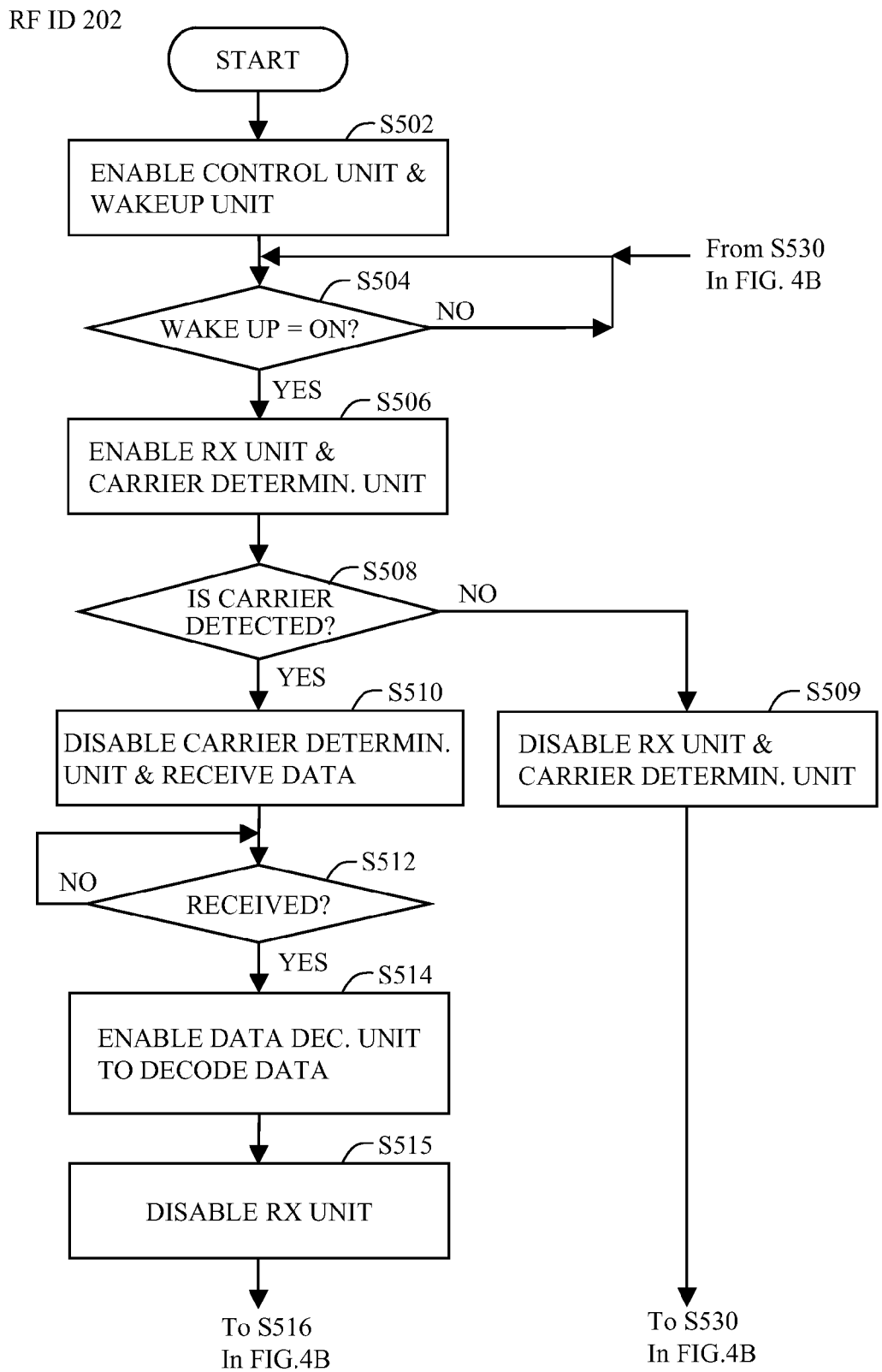
FIGS. 4A and 4B illustrate a flow chart for the processing performed by the active-type RF ID tag.
Figure 4B:
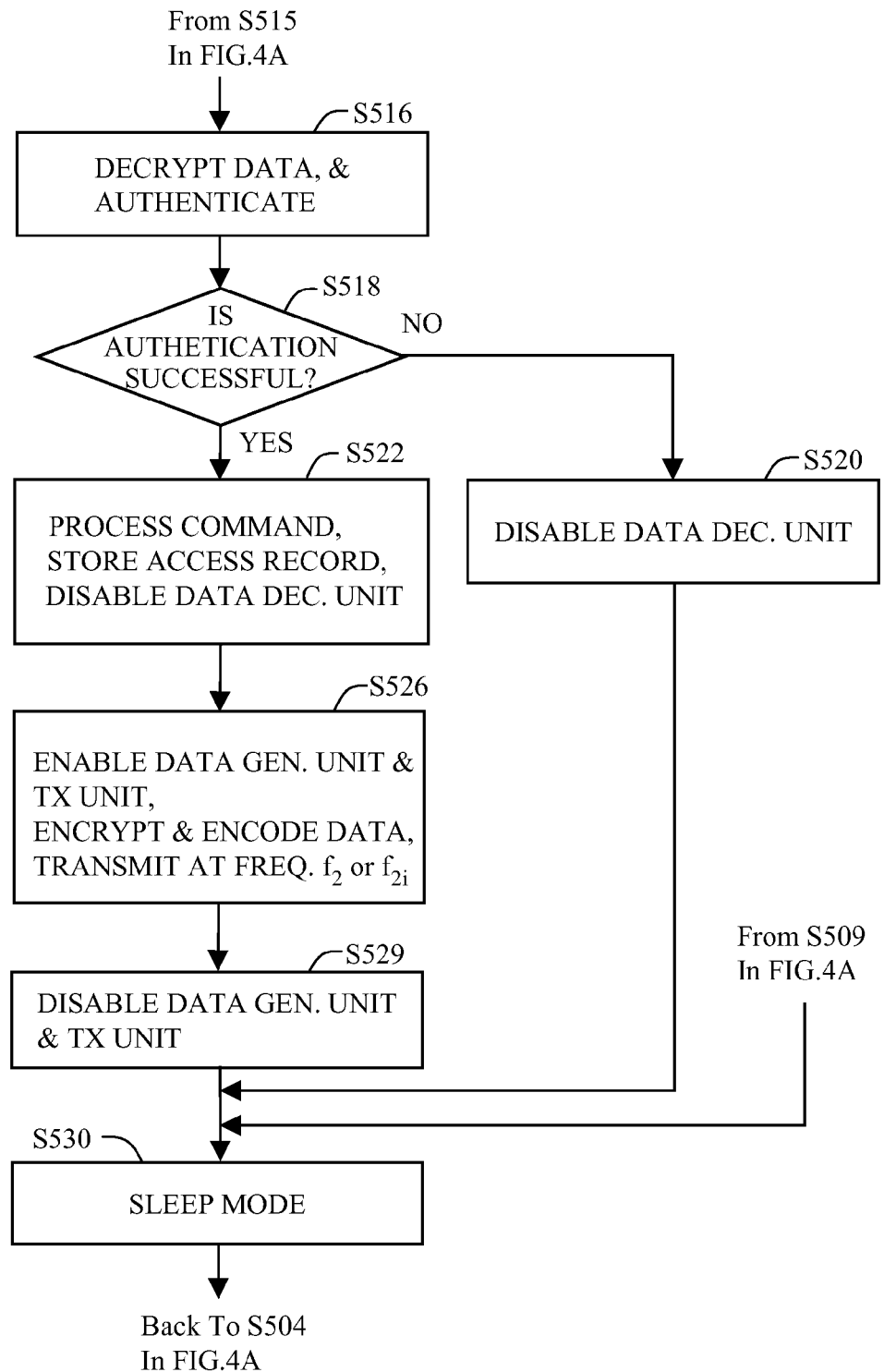

FIG. 3 illustrates a flow chart for the processing performed by the reader/writer device 302. FIGS. 4A and 4B illustrate a flow chart for the processing performed by the active-type RF ID tag 202.

Referring to FIG. 3, at Step 402, the control unit 310 of the reader/writer device 302 determines whether a tag information request command received from the host computer is detected. Step 402 is repeated until a tag information request command is detected. When a tag information request command is detected, the procedure proceeds to Step 404 for processing for transmission and to Step 422 for processing for reception.

At Step 404, the control unit 310 initializes the cycle period timer 374 to set the current count value to be zero (0), and also sets a long cycle period Ctx of operation (e.g., one second) to the cycle period timer 374. At Step 406, the control unit 310 initializes the inactivation timer 376 to set, to the inactivation timer 376, a short inactivation time period Drwcs (e.g., 100 ms) before the carrier sensing 44. At Step 408, in accordance with the timing signal from the inactivation timer 376, the control unit 310 determines whether the inactivation time period Drwcs has elapsed. If it is determined that the inactivation time period has not yet elapsed, the procedure returns to Step 408, so that Step 408 is repeated until the inactivation time period Drwcs elapses.

If it is determined at Step 408 that the inactivation time period has elapsed, the control unit 310 at Step 410 enables the carrier determination unit 346. The control unit 310 at Step 410 may enable the carrier determination unit 346 and the receiver for the RF signal at the transmission frequency $f_1$ of the receiver unit 350 in the periods of time with a short duration, for example of approximately 1-10 ms. In accordance with the data indicative of the power intensity of the received RF signal carrier at the frequency $f_1$ from the receiver unit 350, the carrier determination unit 346 determines the presence or absence of a carrier of the received RF signal carrier at the frequency $f_1$. The carrier determination unit 346 then provides the resultant determination to the control unit 310.

At Step 412, in accordance with the resultant determination, the control unit 310 determines whether a carrier is detected. If it is determined that a carrier is detected, the control unit 310 at Step 413 disables the carrier determination unit 346 and the receiver for an RF signal at the transmission frequency $f_1$ of the receiver unit 350.

At Step 414, the control unit 310 determines whether the cycle period Ctx has elapsed. If it is determined that the cycle period has not yet elapsed, Step 414 is repeated until the cycle period elapses. Thus, in the remaining time period within the cycle period Ctx, the data generation unit 322 and the transmitter unit 330 are inactivated or disabled. If it determined that the cycle period Ctx has elapsed, the procedure returns to Step 404. Thus, the reader/writer device 302 starts the next cycle period Ctx of its operation.

If it is determined at Step 412 that no carrier is detected, then the control unit 310 at Step 415 determines whether the cycle period Ctx has elapsed. If it is determined that the cycle period Ctx has elapsed, then the procedure returns to Step 404. Thus, the reader/writer device 302 starts the next cycle period Ctx of its operation.

If it is determined at Step 415 that the cycle period Ctx has not yet elapsed, the control unit 310 at Step 416 provides a tag information request command and the related information to the data generation unit 322.

The data generation unit 322 encrypts data including the tag information request command received from the control unit 310 and including the current date and time-of-day information T, the system ID (ID_system) and an ID of the reader/writer device 302 retrieved from the memory 314, with the encryption key Ke retrieved from the memory 314 in accordance with a given cryptosystem. The cryptosystem may be the DES (Data Description Standard), the Triple DES or the AES (Advanced Encryption Standard), for example. The data generation unit 322 then encodes the encrypted data to thereby generate encoded data in accordance with a given encoding scheme, such as the NRZ (Non-Return-to-Zero) encoding system or the Manchester encoding system. The transmitter unit 330 modulates the carrier with the encoded data in the time slot of processing for transmission 42 of FIG. 2A, and then transmits the RF signal at the frequency $f_1$.

The control unit 310 may incorporate, into the tag information request command, data for specifying the transmission frequency $f_2$ or the variable transmission frequencies $f_{2i}$ to be used for a response to the tag information request command, and data indicative of date and time of day or time slots to be used for the variable transmission frequencies $f_{2i}$, as well as data indicative of the current date and time of day T, and a control schedule and a time control sequence.

The reader/writer device 302 may change the frequencies $f_{2i}$ in a time division manner, selecting one of the frequencies for every set of commands in respective transmission cycles $t_{RW-CY}$, the number of which may correspond, for example, to the time length of one or more cycles for sensing a carrier.

This may reduce the probability of collision between response RF signals transmitted from a plurality of RF ID tags which simultaneously approach the reader/writer device 302. This may increase the number of RF ID tags that the reader/writer device 302 can simultaneously identify.

At Step 418, the control unit 310 determines whether the processing for data transmission is to be terminated. If it is determined that the data transmission is to be terminated, the procedure exits this routine. If it is determined that the processing for data transmission is to be continued, the procedure returns to Step 415. In FIG. 2A, the data transmission is repeated and continued.

Steps 415 to 418 are repeated until the cycle period Ctx elapses after the transmission inactivation time period 41. Thus, in the remaining time period after the non-detection of a carrier at the frequency $f_1$ within the cycle period Ctx, the transmitter unit 330 repeats transmission of an RF signal at the frequency $f_1$ that carries a tag information request command.

Referring to FIG. 4A, at Step 502, when the RF ID tag 202 is activated, the control unit 210 and the timing generator unit 260 (the wakeup unit 270) are enabled. Once the RF ID tag 202 is activated, the control unit 210 and the timing generator unit 260 are constantly enabled, and hence are in an active state. In accordance with the timer 274 and with the time control sequence, the wakeup unit 270 provides the control unit 210 with a wakeup signal indicative of the timing for sensing a carrier of a received RF signal in a carrier sensing cycle Tcs. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 for the reception frequency $f_1$ and the carrier determination unit 246 for a short duration, for example, of approximately 1-10 ms. Then, the enabled receiver unit 250 enters into the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210.

At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and continues to enable the receiver unit 250 in a further particular duration, for example of 100-200 ms, to receive an RF signal at the frequency $f_1$ carrying a command from the reader/writer device 302 (reception 54 in FIG. 2C), and then demodulates the received RF signal at the reception frequency $f_1$. At Step 512, the control unit 210 determines whether the receiver unit 250 has received the RF signal. Step 512 is repeated until the reception of the RF signal is completed.

If it is determined at Step 512 that the RF signal has been received, then the control unit 210 at Step 514 enables the data decoding unit 242. The enabled data decoding unit 242 receives the received data from the receiver unit 250 under the control of the control unit 210, and then decodes the received data in accordance with the encoding scheme. At Step 515, the control unit 210 disables the receiver unit 250.

Referring to FIG. 4B, at Step 516, under the control of the control unit 210, the data decoding unit 242 decrypts the decoded data with the encryption/decryption key Ke retrieved from the memory 214 in accordance with the cryptosystem, and then provides the decrypted data including the command, the tag ID (ID_tag), the date and time-of-day information T, and the system ID (ID_system) to the control unit 210. The data may include a control schedule and a time control sequence. Upon receiving the data, the control unit 210 compares the decrypted date and time-of-day T and system ID with the stored date and time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that the authentication has been unsuccessful, the control unit 210 at Step 520 disables the data decoding unit 242. Then, the procedure proceeds to Step 530.

If it is determined at Step 518 that the authentication has been successful, the control unit 210 at Step 522 receives the decrypted decoded data including the tag information request command from the data decoding unit 242, then processes the received command included in the decrypted data, and then stores into the memory 214 the record of access performed by the reader/writer device 302. The control unit 210 further disables the data decoding unit 242.

When a time correction command and the current date and time-of-day information T are included in the received data, the control unit 210 corrects or updates the time of the timer 274 of the wakeup unit 270 into the current time T.

At Step 526, in accordance with the tag information request command, the control unit 210 enables the data generation unit 222 and the transmitter unit 230 in a time slot selected at random from a given number of time slots within a given period of time. This selected time slot corresponds to the time period of the processing for transmission 56 of FIG. 2C.

The data generation unit 222 encrypts data including the tag ID (ID_tag) of the RF ID tag 202, the date and time-of-day information T, the system ID (ID_system) and the ID of the reader/writer device 302 read out from the memory 214, with the encryption key Ke in accordance with the cryptosystem. The data generation unit 222 then encodes the encrypted data in accordance with the encoding scheme, and then provides the encoded encrypted data to the transmitter unit 230.

The enabled transmitter unit 230 modulates the carrier with the encoded encrypted data, and then transmits the RF signal at the frequency $f_2$ or $f_{2i}$ via the antenna 284 (transmission 56 in FIG. 2C). The frequency $f_{2i}$ is changed by the frequency changing unit 212 of the control unit 210. The timing unit 213 adjusts a plurality of successive cycle time slots to occur in a given cycle.

At Step 529, the control unit 210 disables the data generation unit 222 and the transmitter unit 230. At Step 530, the control unit 210 causes the RF ID tag 202 to enter into the sleep mode of operation. In the sleep mode of operation, basically, only the control unit 210 and the timing generator unit 260 (including the wakeup unit 270) continue to stay in the enabled state, while the other elements 214-250 are disabled.

Referring back to FIG. 3, at Step 422, the control unit 310 enables the receiver unit 350 to enter into the receive ready state. The receiver unit 350 waits for the reception of an RF signal at the frequency $f_2$ (receive ready 46), and then receives an RF signal (processing for reception 48). At Step 424, the control unit 310 determines whether the receiver unit 350 has received the RF signal. Steps 424-424 are repeated until the reception is completed. If it is determined that the RF signal has been received, the procedure proceeds to Step 428.

At Step 428, the receiver unit 350 provides the received data to the data decoding unit 342. The data decoding unit 342 decodes the received data in accordance with the encoding scheme, then decrypts the decoded data in accordance with the cryptosystem, and then provides the determination of data reception and the decrypted data to the control unit 310. The control unit 310 compares the decrypted date and time T and system ID with the stored date and time T and system ID in the memory 314, to determine whether the decrypted time information and ID match with the stored time information and ID, in order to authenticate the RF ID tag 202. Even if there is an error between the received time information T and the stored time information T that falls within an allowable range (e.g., ±0.5 seconds) in the control unit 210 of the RF ID tag 202 and in the control unit 310 of the reader/writer device 302, they may determine that the received time information matches with the stored time information.

At Step 430, the control unit 310 determines whether the authentication has been successful. If it is determined that the authentication has been unsuccessful, the procedure returns to Step 422. If it is determined that the authentication has been successful, the procedure proceeds to Step 432.

At Step 432, the control unit 310 stores the decoded data in the memory 314 and transmits the decoded data to the host computer. At Step 436, the control unit 310 determines whether the data receive ready state is to be terminated. If it is determined that the data receive ready state is to be terminated, the procedure exits the routine of FIG. 3. If it is determined that the data receive ready state is to be continued, the procedure returns to Step 422. In FIG. 2B, the data receive ready state is repeated and continued.

Thus, the reader/writer device 302 transmits the RF signal cyclically at sufficiently short intervals, and is constantly in the ready state to receive the RF signal over the long transmission periods of time. This may significantly reduce the carrier sensing time of the RF ID tag 202.

In a control schedule stored in the memory 214, the holidays and a period of time between a particular time point and another particular time point in the night-time (e.g., 6:00 pm to 6:00 am) of the weekdays may be specified, while a period of time between a particular time point and another particular time point in the daytime (e.g., 6:00 am to 6:00 pm) of the weekdays may be specified. In this case, the wakeup unit 270 generates no wakeup signal on the holidays and in the night-time, i.e., the RF ID tag 202 is in a deeper sleep mode of operation, and does not perform carrier sensing at all. In contrast, it performs carrier sensing in a given cycle (e.g., of one second) in the daytime of the weekdays.

Under the control of the control unit 210, the wakeup unit 270 may generate a wakeup signal depending on the remaining power level P of the battery 290 stored in the memory 214. In this case, when the remaining battery power level P is sufficiently high, the carrier sensing may be performed in a relatively short cycle (e.g., of one second). On the other hand, when the remaining battery power level P goes below a threshold Pth, the carrier sensing may be performed in a relatively long cycle (e.g., of two seconds).

When the reader/writer device 302 suspends the transmission of an RF signal at the frequency $f_1$ in the transmission inactivation time period 41 in order to avoid the interference, the active-type RF ID tag 202 cannot detect a carrier of an RF signal from the reader/writer device 302 in the transmission inactivation time period 41 even if it is located near the reader/writer device 302. However, while the transmission of an RF signal from the reader/writer device is suspended for a long time, if the RF ID tag continues the carrier sensing until it detects an RF signal, then the power consumption of the RF ID tag increases.

The inventors have recognized that an RF ID tag may be adapted to repeat the carrier sensing in a short cycle up to a limited, maximum number of times while the RF ID tag detects no RF signal transmitted by a reader/writer device, so that the power consumption of the RF ID tag is minimized and also the RF ID tag may detect more reliably an RF signal transmitted by the reader/writer device.

The inventors have also recognized that the RF ID tag may be adapted to cyclically or repeatedly sense a carrier at a transmission frequency with transmission inhibited while or every time it detects such a carrier, so that it inhibits the transmission of an RF signal when it detects such a carrier, and it transmits an RF response signal at the transmission frequency when it does not detect such a carrier, which may reduce the probability of interference of such an RF signal with another RF signal transmitted by another RF ID tag.

Figure 5:
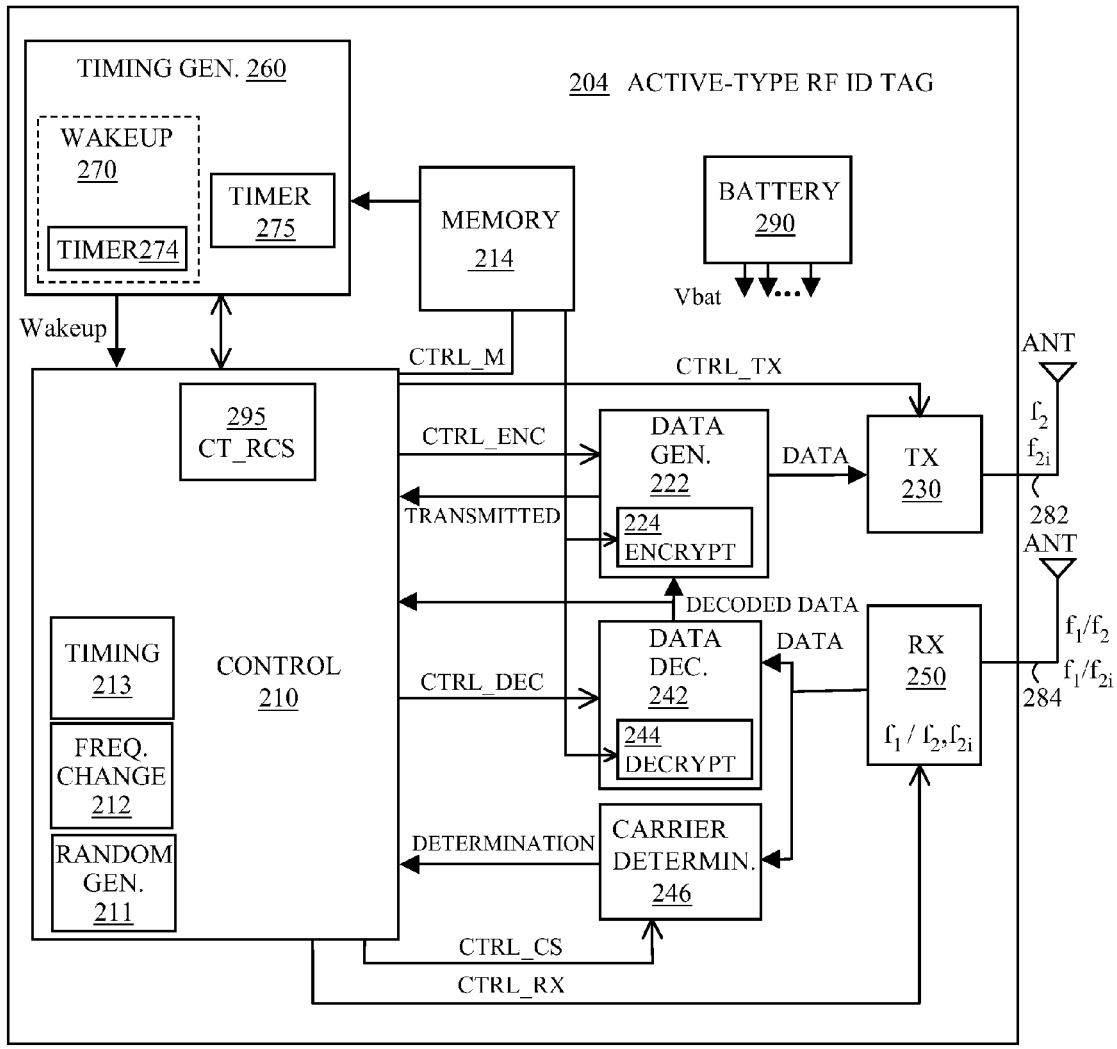
FIG. 5 illustrates a configuration of an active-type RF ID tag as an active-type contactless information storage device, in accordance with an embodiment of the present invention.

FIG. 5 illustrates a configuration of an active-type RF ID tag 204 as an active-type contactless information storage device, in accordance with an embodiment of the invention. The reader/writer device 302 of FIG. 1 may be used to read and write information in the RF ID tag 302.

The RF ID tag 204 includes the control unit 210, the memory 214, the data generation unit 222, the transmitter unit (TX) 230, the receiver unit (RX) 250, the data decoding unit 242, the carrier determination unit 246, the timing generator unit 260, the transmitting antenna (ANT) 282, the receiving antenna (ANT) 284, and a battery 290.

The receiver unit 250 includes a receiver for receiving an RF signal at the frequency $f_1$ from the reader/writer device 302, and another receiver for receiving an RF signal at the frequency $f_2$ or frequencies $f_{21}$ to $f_{2n}$. Alternatively, the receiver unit 250 may not include such a receiver for receiving an RF signal at the frequency $f_2$ or frequencies $f_{21}$ to $f_{2n}$. Then, in place of the transmitter unit 230, a transceiver unit may be employed such that the transceiver unit includes the transmitter unit 230 for transmitting an RF signal at the frequency $f_2$ or frequencies $f_{21}$ to $f_{2n}$ and a further receiver for receiving an RF signal at the frequency $f_2$ or frequencies $f_{21}$ to $f_{2n}$. In this case, the control unit 210 enables the receiver for receiving an RF signal at the frequency $f_2$ or frequencies $f_{21}$ to $f_{2n}$ in the transceiver rather than the receiver for receiving an RF signal at the frequency $f_2$ or frequencies $f_{21}$ to $f_{2n}$ in the receiver unit 250.

The receiver unit (RX) 250 receives and demodulates RF signals at the frequency $f_1$ and the frequency $f_2$ or $f_{2i}$ to thereby reproduce baseband encoded data, and also generates data indicative of the carrier intensities of the received RF signals.

The timing generator unit 260 includes a wakeup unit 270 including the timer 274, and a timer 275 for inactivating or delaying the carrier sensing of a received RF signal at the frequency $f_1$. The timing generator unit 260 is constantly in an active state after the power activation of the RF ID tag 204.

The receiver unit (RX) 250 includes the receiver for an RF signal at the reception frequency $f_1$ and the receiver for receiving an RF signal at the transmission frequency $f_2$ or $f_{2i}$. The control unit 210 includes a counter 295, which counts the number of occurrences of retrying the carrier sensing.

The carrier determination unit 246 receives, from the receiver unit 250, the data indicative of the power intensities of a received RF signal carrier at the reception frequency $f_1$ and a received RF signal carrier at the transmission frequency $f_2$ or $f_{2i}$, and determines the presence or absence of such received carriers at the reception frequency $f_1$ and the transmission frequency $f_2$ or $f_{2i}$ in accordance with the data indicative of the carrier power intensities. The carrier determination unit 246 then provides the resultant determinations to the control unit 210.

The counter 295 may count the number, CT_RCS, of occurrences of non-detection (ND) of a reception frequency carrier in the preceding carrier sensing 50 at the reception frequency ($f_1$) occurring in response to a wakeup signal (Wakeup), and in the subsequent carrier sensing 52 at the reception frequency which follows each sleep or inactivation period of time Drcs (e.g., 120 ms) subsequent to each carrier sensing. Alternatively, the counter 295 may count the number, CT_RCS, of occurrences of the sleep period of time Drcs occurring due to non-detection of a reception frequency carrier in the preceding carrier sensing 50 and the subsequent carrier sensing 52. The counter 295 holds a threshold value $N_{TH\text{-}RCS}$ of the number of occurrences of the carrier sensing 50 and 52 or the sleep period of time Drcs, for comparison with the count value CT_RCS.

The value of the sleep or inactivation period of time Drcs and the threshold value $N_{TH\text{-}RCS}$ of the number of times of carrier sensing or inactivation time periods are transmitted by the reader/writer device 302 beforehand to the RF ID tag 204, and then are pre-stored by the control unit 210 in the memory 214. Under the control of the control unit 210, the sleep period of time Drcs of the timer 275 of the timing generator unit 260 is set up or changed, in accordance with the value of the sleep period of time Drcs stored in the memory 214. The threshold value $N_{TH\text{-}RCS}$ is set to or changed in the counter 295 by the control unit 210, in accordance with the threshold value NTH-RCS stored in the memory 214.

The other elements of the RF ID tag 204 are similar to those of the RF ID tag 202 of FIG. 1, and hence will not be described again.

FIG. 6A illustrates a time chart of a transmission inactivation or disabled time period 41, carrier sensing 44 at the transmission frequency $f_1$, and processing for transmission 42 of an RF signal carrying a tag information request command (CMD), in the reader/writer device 302. FIG. 6B illustrates a time chart of a receive ready state 46 and of processing for reception 48 of a received RF signal in the reader/writer device 302. FIG. 6C illustrates a time chart of carrier sensing 50 and 52 of received RF signals, carrier sensing 58 of a transmitted RF signal, processing for reception 54 of received RF signals, and processing for transmission 56 of an RF signal carrying a response, in the active-type RF ID tag 204.

Referring to FIG. 6A, the data generation unit 322 of the reader/writer device 302 generates data including a tag information request command for the RF ID tag. The data generation unit 322 then encrypts the generated data, and then encodes the encrypted data, to thereby generate encoded encrypted data.

In the inactivation time period Drwcs within the transmission inactivation time period 41, the transmitter unit 330 suspends the transmission of an RF signal at the frequency $f_1$. Within the transmission inactivation time period 41, in the carrier sensing time period 44 following the inactivation time period Drwcs, the receiver for the frequency $f_1$ of the receiver unit 350 and the carrier determination unit 346 sense a carrier at the transmission frequency $f_1$. If a carrier is detected (DT), the control unit 310 continues the transmission inactivation time period 41 in the remaining time period within the cycle period Ctx.

On the other hand, when no carrier is detected in the carrier sensing time period 44 (ND), the control unit 310 controls the transmitter unit 330 to transmit the RF signal carrying the command cyclically at the sufficiently short intervals and in the successive time slots in the processing for transmission 42, during the remaining transmission period of time 40 within the cycle period Ctx.

Referring to FIG. 6C, in the active-type RF ID tag 204, in response to a wakeup signal from the wakeup unit 274, the control unit 210 enables the receiver unit 250 and the carrier determination unit 246 in the periods of time for carrier sensing 50 with a particular duration, for example of approximately 1-10 ms, occurring in a preset carrier sensing cycle Tcs, for example of 0.8 seconds. This causes the receiver unit 250 to enter into a receive ready state. Then the enabled carrier determination unit 246 determines the presence or absence of a received carrier, in accordance with the data received from the receiver unit 250 that is indicative of the power intensity of the received RF signal carrier.

When the RF ID tag 204 is not located near the reader/writer device 302, or when the reader/writer device 302 suspends its transmission of the RF signal, the carrier determination unit 246 of the RF ID tag 204 detects no carrier at the frequency $f_1$ (ND), and hence determines the absence of a carrier of an RF signal from a reader/writer device.

If it is determined that no carrier at the reception frequency $f_1$ is detected (ND), then in the subsequent sleep period of time Drcs, the control unit 210 disables the receiver unit 250 and the carrier determination unit 246, so that the RF ID tag 204 enters into a sleep mode of operation. After the sleep period of time Drcs, the control unit 210 enables the receiver for the reception frequency $f_1$ of the receiver unit 250 and the carrier determination unit 246 in the periods of time for carrier sensing 52 with a particular duration. This causes the receiver unit 250 (the receiver for the reception frequency $f_1$) to enter into a receive ready state. Then the enabled carrier determination unit 246 determines the presence or absence of a received carrier at the reception frequency $f_1$.

The combination of the sleep or inactivation period of time Drcs and the subsequent carrier sensing 52 at the reception frequency $f_1$ for retry occurs repeatedly up to a maximum number, $N_{TH\text{-}RCS}$, of times (e.g., two or three times) until a carrier at the reception frequency $f_1$ is detected. The length of the sleep or inactivation period of time Drcs in the RF ID tag 204 is preferably longer than the transmission inactivation time period 41, i.e. the sum of the inactivation time period Drwcs and the carrier sensing time period 44, in the reader/writer device 302. This increases the possibility of detection of a carrier at the frequency $f_1$ in the subsequent carrier sensing 52.

Then the control unit 210 controls the RF ID tag 204 to enter into the sleep mode of operation in the sleep period of time 51 before the subsequent carrier sensing 50. After the sleep period of time 51, the control unit 210 enables the receiver for the reception frequency $f_1$ of the receiver unit 250 and the carrier determination unit 246 in the time period of the next carrier sensing 50 occurring in the carrier sensing cycle Tcs in response to a wakeup signal from the wakeup unit 274.

When the receiver unit 250 receives an RF signal from the reader/writer device 302, the carrier determination unit 246 detects the carrier of the RF signal (DT) in the time period for carrier sensing 52, and hence determines the presence of the carrier.

In response to the resultant determination of the presence of the carrier, the receiver unit 250 and the data decoding unit 242 are enabled in the time period of the subsequent processing for reception 54 with a particular duration, for example, of 100 ms.

The enabled receiver unit 250 receives and demodulates the RF signal to thereby reproduce encoded encrypted data including a command. The enabled data decoding unit 242 decodes the data, then decrypts the decoded data, then obtains the command from the data, and then provides the command to the control unit 210.

The control unit 210 authenticates the reader/writer device 302 in accordance with the date and time-of-day information T and the system ID included in the command. In response to the received command, in the carrier sensing time period 58, the control unit 210 enables the receiver for the transmission frequency $f_2$ or $f_{2i}$ in the receiver unit 250 and the carrier determination unit 246. Thus, the receiver unit 250 (the receiver for the frequency $f_2$ or $f_{2i}$) enters into a receive ready state. Then the carrier determination unit 246 determines the presence or absence of a transmitted RF signal carrier at the frequency $f_2$ or $f_{2i}$.

When it is determined that no carrier at the transmission frequency $f_2$ or $f_{2i}$ is detected (ND), the control unit 210 enables the data generation unit 222 and the transmitter unit 230 in a time period or slot (e.g., of 100 ms) of processing for transmission 56 selected at random within a given period of time.

The enabled data generation unit 222 encrypts data including desired information, such as the tag ID (ID_tag), the date and time-of-day information T, the system ID (ID_system) and the like retrieved from the memory 214, and then encodes the encrypted data. The enabled transmitter unit 230 modulates the carrier with the encoded response data including the tag ID for transmitting the RF signal carrying the response data.

On the other hand, when it is determined that a transmitted RF signal carrier at the frequency $f_2$ or $f_{2i}$ is detected (DT), the control unit 210 controls the RF ID tag 204 to enter into the sleep mode of operation in the sleep period of time 51 before the time period of the subsequent carrier sensing 50. This may prevent possible interference between the transmitted RF signal from the RF ID tag 204 and another transmitted RF signal from another RF ID tag and the like.

In the period of time 51 appearing between the two adjacent carrier sensing time periods 50, the RF ID tag 204 enters into the sleep mode of operation, during which only the control unit 210 and the timing generator unit 260 are enabled or powered on, while the other elements 214-250 are disabled or powered down.

Referring to FIG. 6B, the receiver unit 350 of the reader/writer device 302 is constantly in the receive ready state 46. When the RF ID tag 204 approaches the reader/writer device 302 so that the receiver unit 350 receives an RF signal, the receiver unit 350 demodulates the received RF signal in the time period of processing for reception 48, and then reproduces encoded encrypted data.

The data decoding unit 342 decodes the encoded encrypted data, then decrypts the decoded encrypted data to thereby reproduce the response data including the tag ID, and then provides the reproduced response to the control unit 310.

In response to the received and reproduced response, the control unit 310 authenticates the RF ID tag 204 in accordance with the date and time-of-day information T and the system ID included in the response, and then provides the tag ID and other information to the host computer.

Figure 7A:
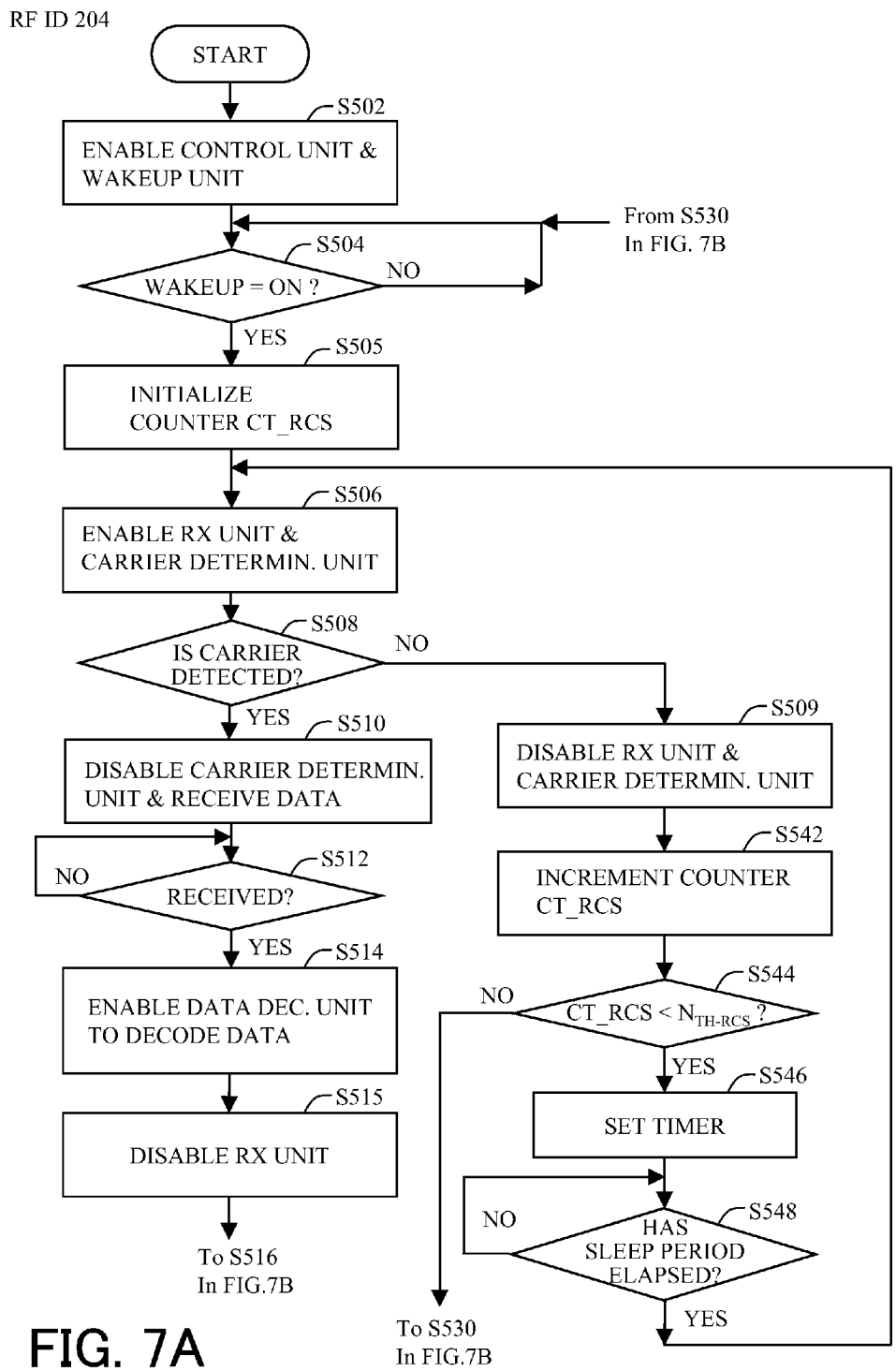
FIGS. 7A and 7B illustrate a flow chart for the processing performed by the active-type RF ID tag.
Figure 7B:
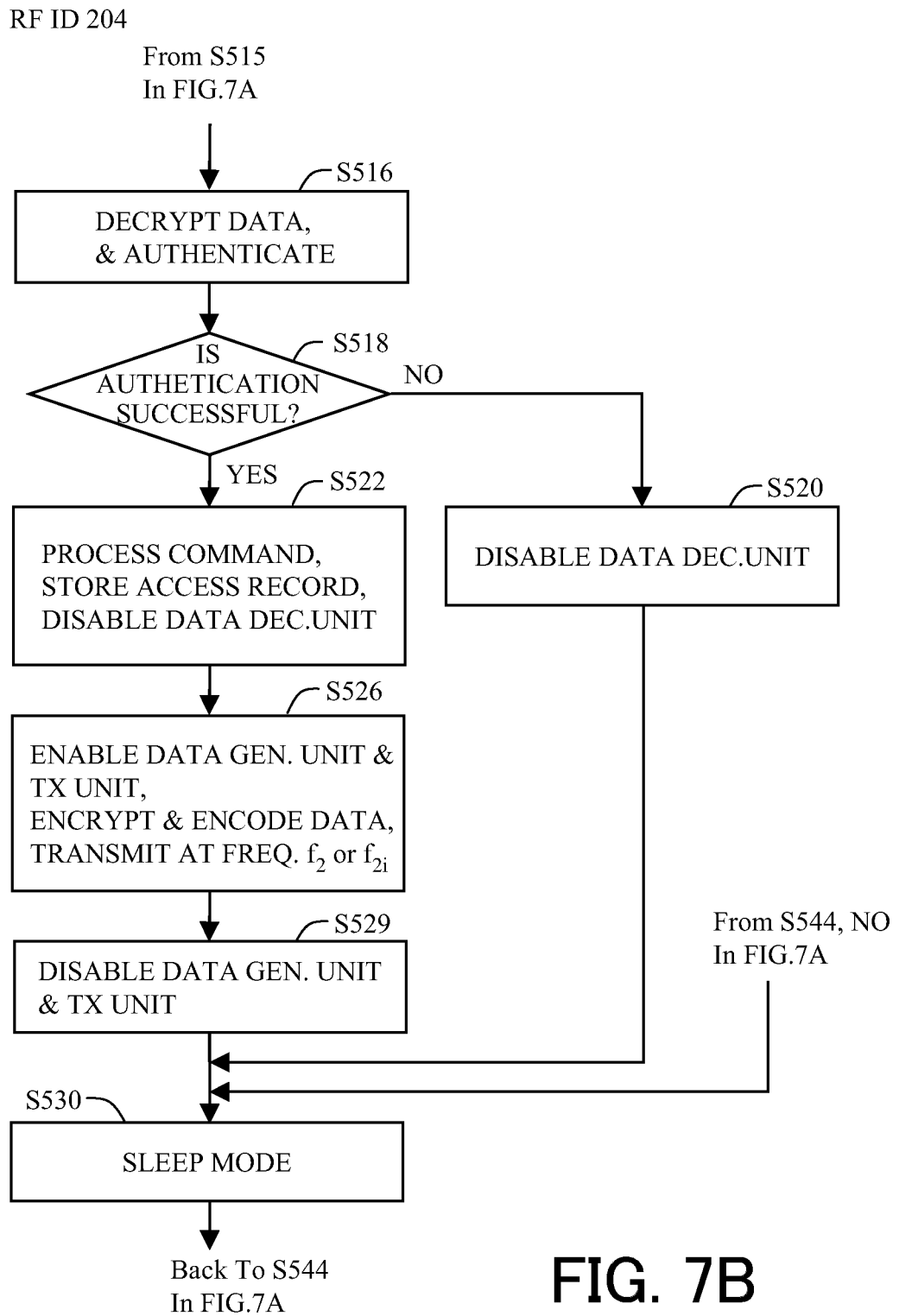

FIGS. 7A and 7B illustrates a flow chart for the processing performed by the active-type RF ID tag 204. The reader/writer device 302 operates in accordance with the flow chart of FIG. 3.

Steps 502-504 are similar to those of FIG. 4A.

At Step 505, the control unit 210 initializes the counter 295 to set the count value CT_RCS to be zero (0) and then set the threshold value $N_{TH\text{-}RCS}$ to the counter 295. Steps 506-509 are similar to those of FIG. 4A.

If it is determined at Step 508 that no carrier at the frequency $f_1$ is detected, then at Step 542 following Step 509, the control unit 210 increments or counts up the count value CT_RCS by one in the counter 295, to set CT_RCS=CT_RCS+1.

At Step 544, the control unit 210 determines whether the count value CT_RCS of the counter 295 is smaller than the threshold value $N_{TH\text{-}RCS}$. If it is determined that the count value CT_RCS is not smaller than the threshold value, i.e., the count value CT_RCS is equal to the threshold value, the procedure proceeds to Step 530 in FIG. 7B. At Step 530, the control unit 210 causes the RF ID tag 204 to enter into the sleep mode of operation.

If it is determined at Step 544 that the count value CT_RCS is smaller than the threshold value, the control unit 210 at Step 546 initializes the timer 275 to thereby set the sleep period of time Drcs to the timer 275. In the sleep period of time Drcs, the RF ID tag 204 enters into the sleep state or the sleep mode of operation.

At Step 548, the control unit 210 determines whether the timer 275 indicates the elapse of the sleep period of time Drcs. Step 448 is repeated until the sleep period of time Drcs elapses. If it is determined that the sleep period of time Drcs has elapsed, the procedure returns to Step 506. Thus, when no carrier is detected, the combination of the sleep period of time Drcs and the carrier sensing 52 occurs repeatedly until the count value CT_RCS in the counter 295 reaches the threshold value $N_{TH\text{-}RCS}$.

Steps 510-515 are similar to those of FIG. 4A.

Referring to FIG. 7B, Steps 516-530 are similar to those of FIG. 4B.

Figure 8:
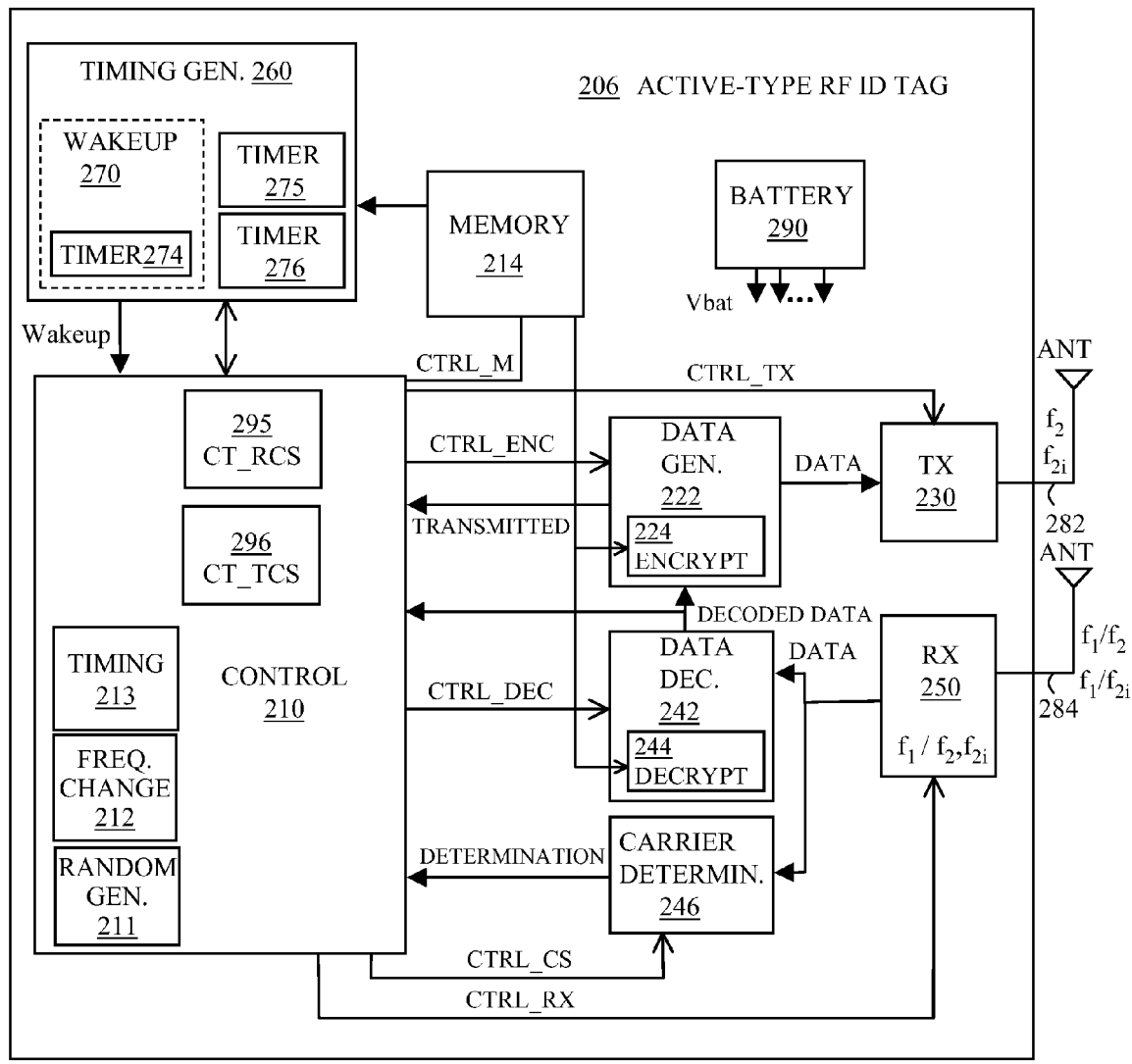
FIG. 8 illustrates a configuration of an active-type RF ID tag as an active-type contactless information storage device, in accordance with another embodiment of the invention.
Figure 9:
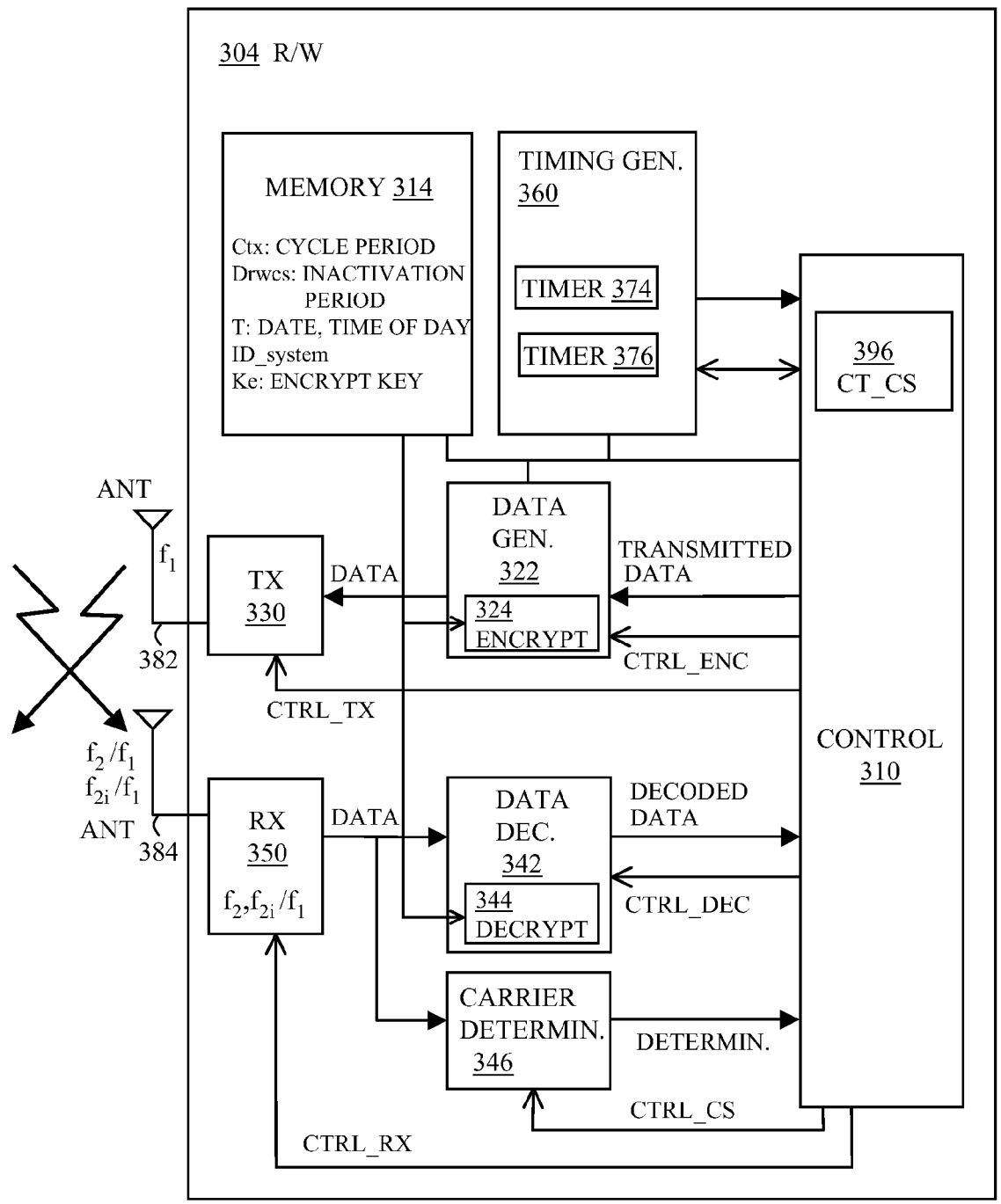
FIG. 9 illustrates a configuration of a reader/writer device in accordance with the embodiment.

FIG. 8 illustrates a modification of the RF ID tag 204 of FIG. 5, and illustrates a configuration of an active-type RF ID tag 206 as an active-type contactless information storage device, in accordance with another embodiment of the invention. FIG. 9 illustrates a modification of the reader/writer device 302 of FIG. 1, and illustrates a configuration of a reader/writer device 304.

Referring to FIG. 8, in the active-type RF ID tag 206, the timing generator unit 260 includes the wakeup unit 270, the carrier sensing inactivation or delay timer 275 for use in sensing a received RF signal carrier at the frequency $f_1$, and a carrier sensing inactivation or delay timer 276 for avoiding interference of a transmitted RF signal at the frequency $f_2$ or $f_{2i}$. The control unit 210 of the RF ID tag 206 includes the counter 295, and a counter 296 for retrying the carrier sensing.

The counter 295 is similar to that of FIG. 5. The counter 296 may count the number CT_TCS of times of non-detection of a carrier at the transmission frequency, in the preceding carrier sensing 58 at the transmission frequency ($f_2$ or $f_{2i}$) that follows the command reception and in the subsequent carrier sensing 59 at the transmission frequency that follows each subsequent sleep or inactivation period of time Dtcs. Alternatively, the counter 296 may count the number CT_TCS of times of occurrence of a sleep or inactivation period of time Dtcs occurring due to the non-detection of a carrier at the transmission frequency, in the preceding carrier sensing 58 at the transmission frequency ($f_2$ or $f_{2t}$) and in the subsequent carrier sensing 59 at the transmission frequency. For comparison with the count value CT_TCS, the counter 296 holds a threshold value $N_{TH-TCS}$ for the number of times of occurrence of the carrier sensing 58 and 59 or the sleep period of time Dtcs.

The value of the sleep or inactivation period of time Drcs is transmitted beforehand by the reader/writer device 304 to the RF ID tag 206, and pre-stored into the memory 214 by the control unit 210. The control of the control unit 210 sets or changes the sleep period of time Dtcs to or in the timer 276 of the timing generator unit 260, in accordance with the value of the sleep period of time Dtcs stored in the memory 214. The threshold value $N_{TH-TCS}$ is set to or changed in the counter 296 by the control unit 210 in accordance with the threshold value $N_{TH-TCS}$ stored in the memory 214.

The other elements of the RF ID tag 206 are similar to those of the RF ID tag 204 of FIG. 5.

Referring to FIG. 9, the reader/writer device 304 includes the control unit 310, the memory 314, the data generation unit 322, the transmitter unit (TX) 330, the receiver unit (RX) 350, the data decoding unit 342, the carrier determination unit 346, the timing generator unit 360, the transmitting antenna (ANT) 382, and the receiving antenna (ANT) 384.

In the reader/writer device 304, the timing generator unit 360 includes the cycle period timer 374, and the inactivation or delay timer 376 for avoiding interference of the transmitted RF signal. The timing generator unit 360 generates inactivation timings, carrier sensing timings, and transmission timings. The control unit 310 includes a counter 396 for retrying the carrier sensing.

In the cycle period Ctx, the counter 396 may count the number CT_CS of times of non-detection of a received carrier at the transmission frequency, in the preceding carrier sensing 44 at the transmission frequency ($f_1$) and in the subsequent carrier sensing 45 at the transmission frequency that follows each subsequent inactivation time period Drwcs. Alternatively, in the cycle period Ctx, the counter 396 may count the number CT_CS of times of occurrence of an inactivation time period Drwcs occurring due to the non-detection of a carrier at the transmission frequency, in the preceding carrier sensing 44 at the transmission frequency ($f_1$) and in the subsequent carrier sensing 45 at the transmission frequency.

Figure 10:
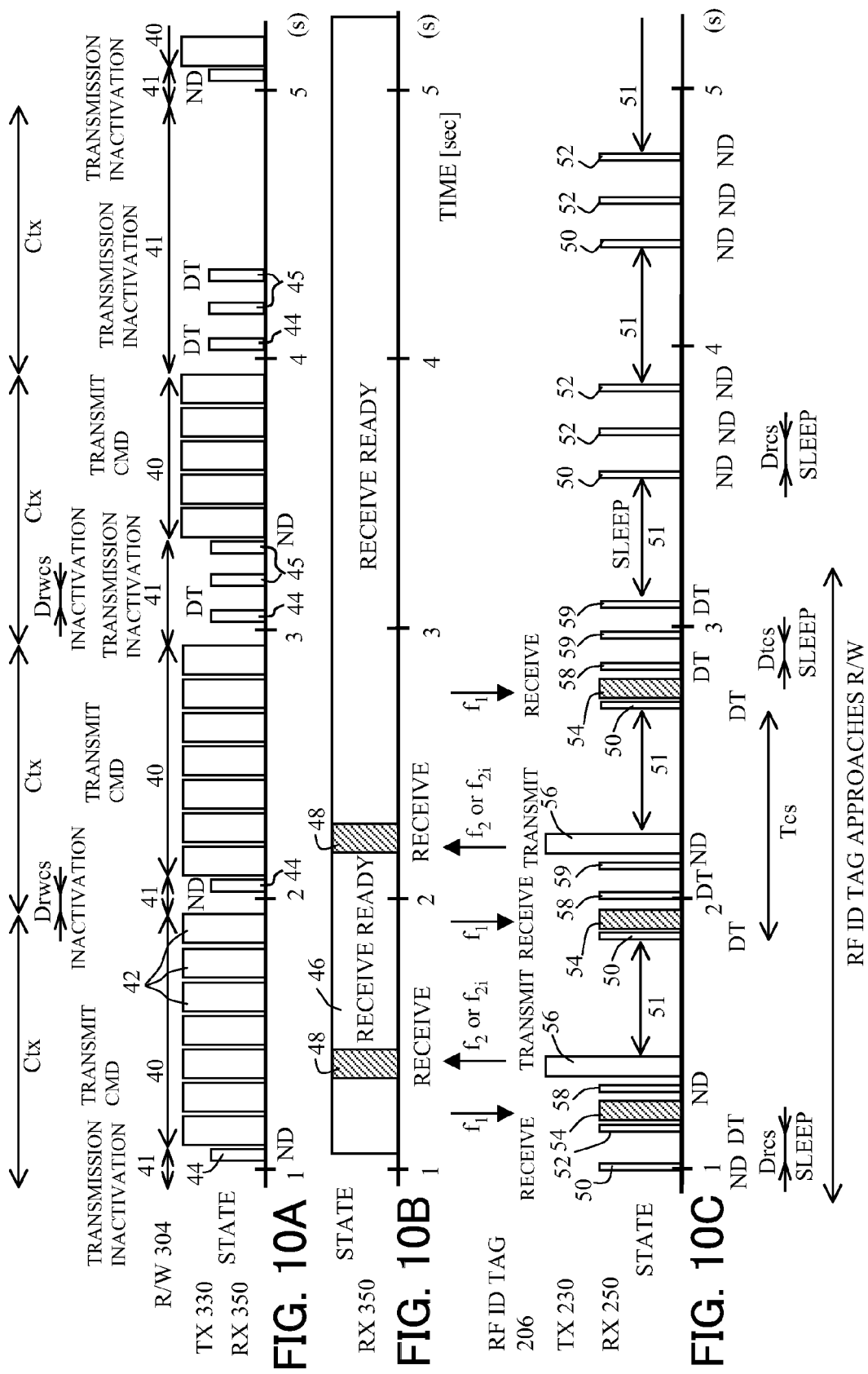
FIG. 10A illustrates a time chart of a transmission inactivation time period, carrier sensing at the transmission frequency, and processing for transmission of an RF signal carrying a tag information request command, in the reader/writer device.
FIG. 10B illustrates a time chart of a receive ready state and of processing for reception of a received RF signal in the reader/writer device.
FIG. 10C illustrates a time chart of carrier sensing of received RF signals, carrier sensing of transmitted RF signals, processing for reception of a received RF signal, and processing for transmission of an RF signal carrying a response, in the active-type RF ID tag.

FIG. 10A illustrates a time chart of a transmission inactivation or disabled time period 41, carrier sensing 44 and 45 at the transmission frequency $f_1$, and processing for transmission 42 of an RF signal carrying a tag information request command (CMD), in the reader/writer device 304. FIG. 10B illustrates a time chart of a receive ready state 46 and of processing for reception 48 of a received RF signal in the reader/writer device 304. FIG. 10C illustrates a time chart of carrier sensing 50 and 52 of received RF signals, carrier sensing 58 and 59 of transmitted RF signals, processing for reception 54 of a received RF signal, and processing for transmission 56 of an RF signal carrying a response, in the active-type RF ID tag 206.

Referring to FIG. 1A, the data generation unit 322 of the reader/writer device 304 generates data in a format including a tag information request command (CMD) and the like. The data generation unit 322 then encrypts the generated data, and then encodes the encrypted data, to thereby generate encoded data.

In the inactivation time period Drwcs within the transmission inactivation time period 41, the transmitter unit 330 suspends the transmission of an RF signal at the frequency $f_1$.

During the transmission inactivation time period 41, in the carrier sensing time period 44 following the inactivation time period Drwcs, the receiver for the frequency $f_1$ of the receiver unit 350 and the carrier determination unit 346 sense a carrier at the transmission frequency $f_1$. When a carrier is detected (DT), the control unit 310 in the cycle period Ctx continues the transmission inactivation time period 41 and repeats the inactivation time period Drwcs.

In the carrier sensing time period 45 following the inactivation time period Drwcs, the receiver for the frequency $f_1$ of the receiver unit 350 and the carrier determination unit 346 sense again a carrier at the transmission frequency $f_1$. The combination of the inactivation time period Dwrcs and the carrier sensing time period 45 occurs repeatedly up to a maximum number, $N_{TH-RCS}$, of times (e.g., three times) until such a carrier is no longer detected in the cycle period Ctx. This allows the reader/writer device 304 to have a longer period for transmitting the command. This increases the probability of carrier detection performed by the RF ID tag 206.

On the other hand, when no carrier is detected (ND) in the carrier sensing time period 44 or 45, the control unit 310 controls the transmitter unit 330 to transmit the RF signal carrying the command cyclically at sufficiently short intervals and in the successive time slots in the processing for transmission 42, during the remaining transmission time period 40 within the cycle period Ctx.

Referring to FIG. 10C, in the active-type RF ID tag 206, in response to a wakeup signal from the wakeup unit 274, the control unit 210 enables the receiver unit 250 and the carrier determination unit 246 in the periods of time for carrier sensing 50 with a particular duration, occurring in the preset carrier sensing cycle Tcs. This causes the receiver unit 250 to enter into a receive ready state. Then the enabled carrier determination unit 246 determines the presence or absence of a received carrier, in accordance with the data received from the receiver unit 250 indicative of the power intensity of the received RF signal carrier from the receiver unit 250.

When the RF ID tag 206 is not located near the reader/writer device 304, or when the reader/writer device 304 suspends its transmission of the RF signal, the carrier determination unit 246 of the RF ID tag 206 detects no carrier at the frequency $f_1$ (ND), and hence determines the absence of a carrier of an RF signal from a reader/writer device.

If it is determined that no carrier at the frequency $f_1$ is detected (ND), the control unit 210 disables the receiver unit 250 and the carrier determination unit 246 in the subsequent sleep period of time Drcs, so that the RF ID tag 206 enters into the sleep mode of operation. After the sleep period of time Drcs, the control unit 210 enables the receiver for the frequency $f_1$ of the receiver unit 250 and the carrier determination unit 246 occurring in the time period of carrier sensing 52 with a particular duration. Thus, the receiver unit 250 (the receiver for the frequency $f_1$) enters into a receive ready state. Then, the carrier determination unit 246 determines the presence or absence of a received carrier at the frequency $f_1$.

The combination of the sleep period of time Drcs and the subsequent carrier sensing 52 at the frequency $f_1$ for retry occurs repeatedly up to the maximum number, $N_{TH-RCS}$, of times until a received carrier at the frequency $f_1$ is detected.

When the receiver unit 250 receives an RF signal from the reader/writer device 304, the carrier determination unit 246 detects the carrier of the RF signal (DT) in the time period for carrier sensing 52, and hence determines the presence of the carrier.

In response to the resultant determination of the presence of the carrier, the receiver unit 250 and the data decoding unit 242 are enabled in the time period of the subsequent processing for reception 54 with the particular duration.

The enabled receiver unit 250 receives and demodulates the RF signal to thereby reproduce encoded encrypted data including a command. The enabled data decoding unit 242 decodes the data, then decrypts the decoded data, then obtains the command from the data, and then provides the command to the control unit 210.

In response to the received command, in the carrier sensing time period 58, the control unit 210 enables the receiver for the transmission frequency $f_2$ or $f_{2i}$ of the receiver unit 250 and the carrier determination unit 246. Thus, the receiver unit 250 (the receiver for the frequency $f_2$ or $f_{2i}$) enters into a receive ready state. Then the carrier determination unit 246 determines the presence or absence of a transmitted RF signal carrier at the frequency $f_2$ or $f_{2i}$.

When it is determined that no carrier at the transmission frequency $f_2$ or $f_{2i}$ is detected (ND), the control unit 210 enables the data generation unit 222 and the transmitter unit 230 in the time period or slot of processing for transmission 56 selected at random within a given period of time.

On the other hand, If it is determined that a carrier of an RF signal at the frequency $f_2$ or $f_{2i}$ is detected (DT), the control unit 210 disables the receiver unit 250 and the carrier determination unit 246 in a subsequent sleep or inactivation period of time Dtcs within the cycle period Tcs, so that the RF ID tag 206 enters into a sleep mode of operation. This may prevent possible interference between the RF signal at the transmission frequency to be transmitted from the RF ID device 206 and another transmitted RF signal at the transmission frequency from another RF ID tag.

In the carrier sensing time period 59 following the sleep period of time Dtcs, the control unit 210 enables the receiver for the transmission frequency $f_2$ or $f_{2i}$ of the receiver unit 250 and the carrier determination unit 246 to sense again a carrier at the transmission frequency $f_2$ or $f_{2i}$. Within the carrier sensing cycle period Tcs of sensing a carrier at the reception frequency $f_1$, in a time period before the subsequent carrier sensing 50 at the frequency $f_1$, the combination of the sleep period of time Dtcs and the carrier sensing 59 occurs repeatedly up to a maximum number, $N_{TH-TCS}$, of times (e.g., two or three times) until such a carrier at the transmission frequency $f_2$ or $f_{2i}$ is no longer detected. This may increase the probability of ensuring a sufficient time period for transmitting a response from the RF ID tag 206.

The enabled data generation unit 222 encrypts data including desired information, such as the tag ID (ID_tag) and the like retrieved from the memory 214, and then encodes the encrypted data. The enabled transmitter unit 230 modulates the carrier with the encoded response data including the tag ID for transmitting the RF signal carrying the response data.

When no carrier at the reception frequency $f_1$ is detected (ND), the combination of the subsequent sleep period of time Drcs and the carrier sensing 52 occurs repeatedly up to a maximum number, $N_{TH-RCS}$, of times until such a carrier is detected. After that, the control unit 210 enables the receiver unit 250 and the carrier determination unit 246 to sense a carrier in the subsequent period of time for the carrier sensing 50 occurring in the carrier sensing cycle Tcs in response to a wakeup signal.

Referring to FIG. 10B, the receiver unit 350 of the reader/writer device 304 operates similarly to that of the reader/writer device 302 of FIG. 6B.

Figure 11:
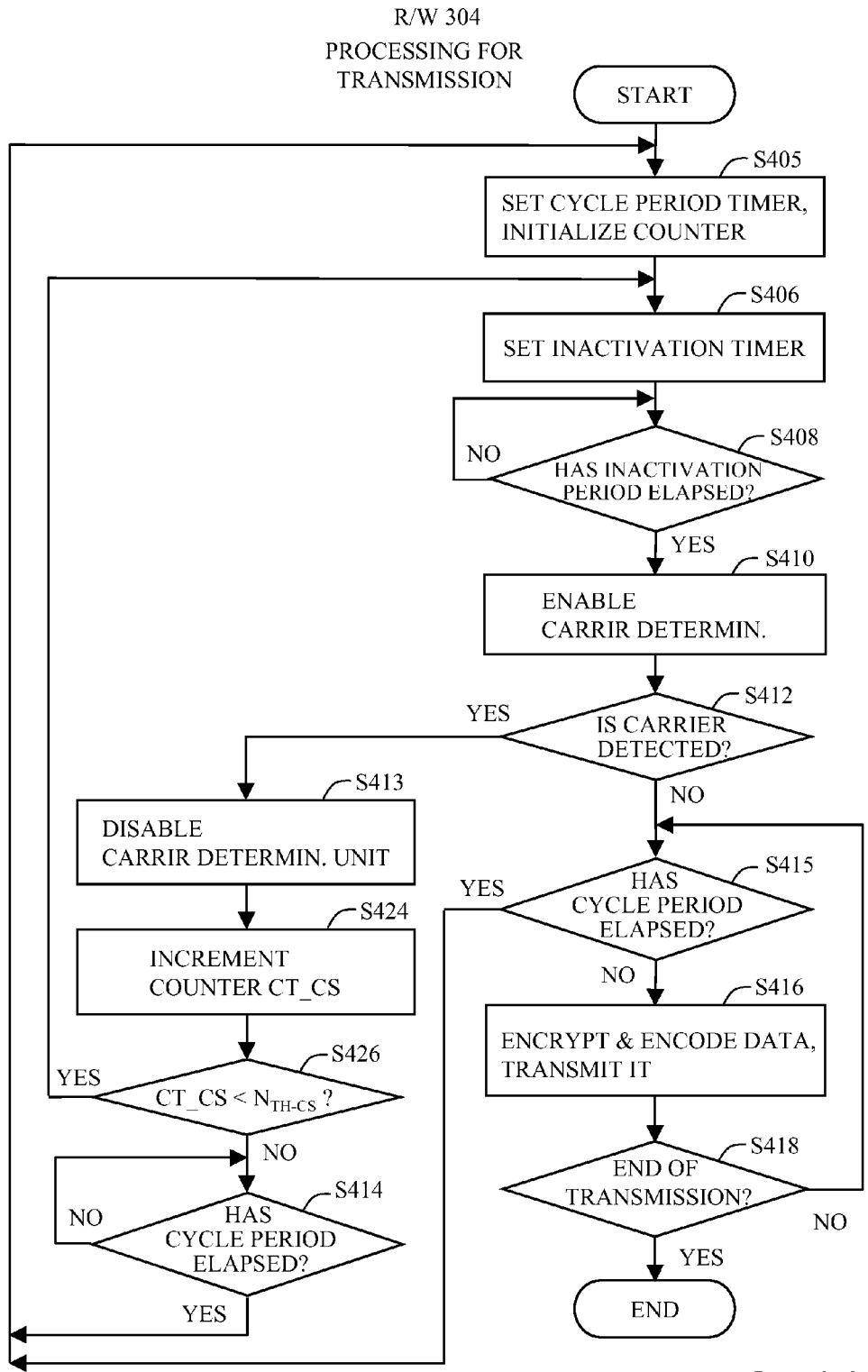
FIG. 11 illustrates a modification of transmission processing of FIG. 3, and illustrates a flow chart for the processing for transmission performed by the reader/writer device.

FIG. 11 illustrates a modification of transmission processing of FIG. 3, and illustrates a flow chart for the processing for transmission performed by the reader/writer device 304. The processing for reception of FIG. 3 is also applied to the reader/writer device 304.

Referring to FIG. 11, at Step 405, the control unit 310 initializes the cycle period timer 374 similarly to Step 404 in FIG. 3, to set a long cycle period Ctx of operation, and then initializes the count value CT_CS of the counter 396 to be zero (0). Steps 406-413 are similar to those of FIG. 3.

If it is determined at Step 412 that a carrier is detected (DT), then at Step 424 following Step 413, the control unit 310 increments or counts up the count value CT_CS in the counter 396 by one. At Step 426, the control unit 310 determines whether the count value CT_CS is smaller than the threshold value $N_{TH-CS}$. If it is determined that the count value CT_CS is smaller than the threshold value $N_{TH-CS}$, the procedure returns to Step 406. Thus, the carrier sensing for retry occurs up to a maximum number, $N_{TH-RCS}$, of times until a carrier at the frequency $f_1$ is no longer detected, during the remaining time period within the cycle period Ctx. If it is determined at Step 426 that the count value CT_CS is not smaller than the threshold value $N_{TH-CS}$, i.e., the count value CT_CS is equal to the threshold value $N_{TH-CS}$, the procedure proceeds to Step 414.

Step 414 is similar to that of FIG. 3. Thus, in the remaining time period of the cycle period Ctx, the data generation unit 322 and the transmitter unit 330 are inactivated.

Steps 415-418 are similar to those of FIG. 3.

Figure 12A:
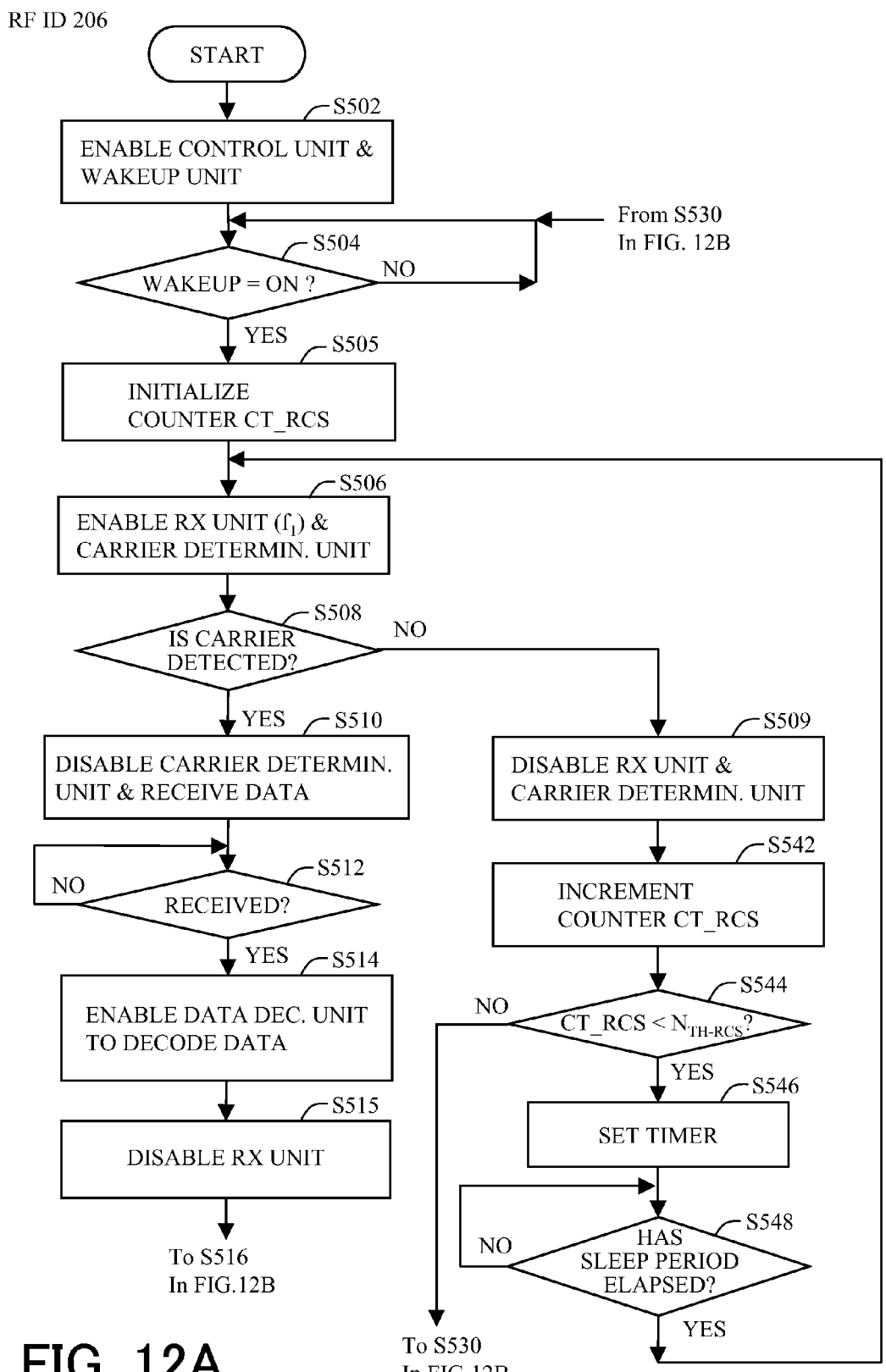
FIGS. 12A and 12B illustrate a modification of the flow chart of FIGS. 7A and 7B, and illustrate a flow chart for the processing performed by the active-type RF ID tag.
Figure 12B:
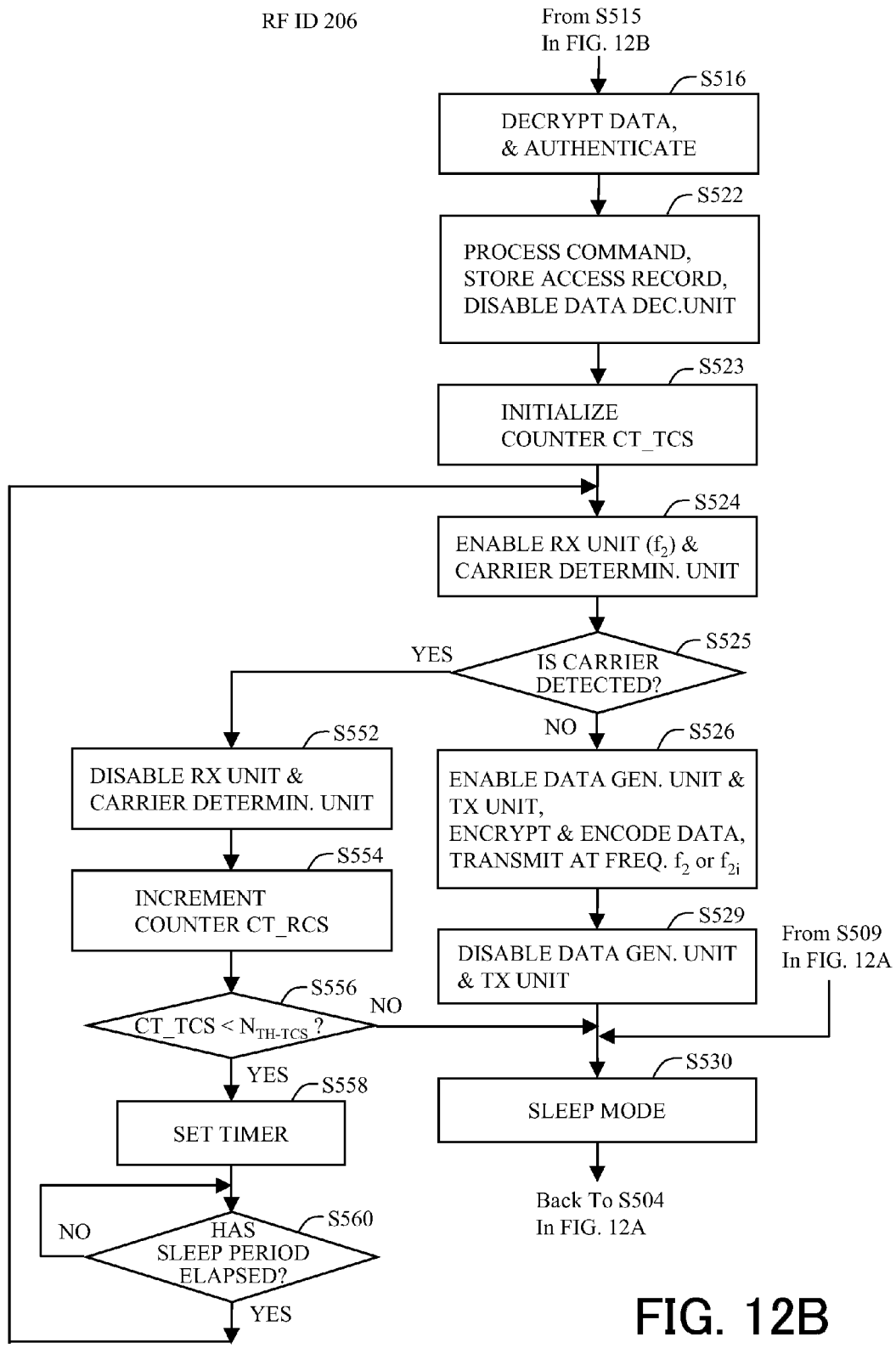

FIGS. 12A and 12B illustrate a modification of the flow chart of FIGS. 7A and 7B, and illustrate a flow chart for the processing performed by the active-type RF ID tag 206.

Referring to FIG. 12A, Steps 502-515 and Steps 542-548 are similar to those of FIG. 7A.

Referring to FIG. 12B, Steps 516-522 are similar to those of FIG. 7B. However, in FIG. 12B, the steps of the processing for authentication of FIG. 7B are not indicated for simplicity.

At Step 523, the control unit 210 initializes the counter 296 to set the count value CT_TCS to be zero (0), and then sets the threshold value $N_{TH-TCS}$ to the counter 296.

At Step 524, the control unit 210 enables the receiver for an RF signal at the transmission frequency $f_2$ or $f_{2i}$ in the receiver unit 250, and the carrier determination unit 246. Then, the carrier determination unit 246 determines the presence or absence of a carrier of an RF signal at the transmission frequency $f_2$ or $f_{2i}$.

At Step 525, the control unit 210 determines whether a carrier at the transmission frequency $f_2$ or $f_{2i}$ is detected by the carrier determination unit 246. If it is determined that no carrier is detected, the procedure returns to Step 526.

It it is determined at Step 525 that a carrier is detected, the control unit 210 at Step 552 disables the receiver unit 250 (the receiver for an RF signal at the transmission frequency $f_2$ or $f_{2i}$) and the carrier determination unit 246. At Step 554, the control unit 210 increments or counts up the count value CT_TCS of the counter 296 by one (CT_TCS=CT_TCS+1).

At Step 556, the control unit 210 determines whether the count value CT_TCS is smaller than the threshold value $N_{TH-TCS}$, or whether the count value CT_TCS is equal to the threshold value $N_{TH-TCS}$. If it is determined that the count value CT_TCS is not smaller than the threshold value $N_{TH-TCS}$, the procedure proceeds to Step 530. At Step 530, the RF ID tag 206 enters into the sleep state or mode of operation, in the remaining time period before the carrier sensing 50 at the frequency $f_1$ occurring in response to the subsequent wakeup signal.

It it is determined at Step 556 that the count value CT_TCS is smaller than the threshold value $N_{TH-TCS}$, the control unit 210 at Step 558 initializes the timer 276 to set the present count value to be zero (0), and then sets the sleep period of time Drcs to the timer 376. At Step 560, the control unit 210 determines whether the timer 276 indicates the elapse of the sleep period of time Dtcs. Step 560 is repeated until the sleep period of time Dtcs elapses. If it is determined that the sleep period of time Dtcs has elapsed, the procedure returns to Step 524. Thus, within the carrier sensing time cycle period Tcs, in a period of time before the subsequent carrier sensing 50 at the frequency $f_1$, the combination of the sleep period of time Dtcs and the carrier sensing 59 occurs repeatedly up to a maximum number, $N_{TH-TCS}$, of times until a carrier at the transmission frequency $f_1$ is no longer detected. This may increase the possibility of transmitting a response RF signal from the RF ID tag 206, i.e., the probability of ensuring a sufficient time period for transmitting a response RF signal from the RF ID tag 206.

Steps 526-530 are similar to those of FIG. 7B.

Although the embodiments have been described in connection with application to the RF ID tags, it should be understood by those skilled in the art that the invention is not limited to such RF ID tags and is also applicable to contactless IC cards.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information access system comprising:
a reader/writer device including:
a first memory,
a first timing generator configured to measure time,
a first transmitter unit configured to transmit an information request signal at a first frequency in a transmission time period,
a first receiver unit configured to receive a response signal at a second frequency which is different from the first frequency, and
a first control configured to cause the first transmitter unit to suspend its transmission in a non-transmission time period; and
an information storage device including:
a second memory configured to store an identification,
a second timing generator configured to measure time,
a battery,
a second receiver unit configured to sense a carrier of an RF signal at a first frequency for detection, in a first time period that occurs at time intervals, and further receive the information request signal in response to detection of a carrier of an RF signal at the first frequency, and to sense a carrier of an RF signal at the second frequency in response to reception of the information request signal,
a second control configured to cause the second receiver unit to sense a carrier of an RF signal at the first frequency for detection, in a second time period after a sleep time period which is shorter than the time interval, in response to determination of non-detection by the second receiver unit of a carrier of an RF signal at the first frequency in the first time period, wherein the shorter sleep time period and the subsequent sensing of a carrier of an RF signal at the first frequency are repeated during the time interval unless a carrier of an RF signal at the first frequency is detected as long as a count of determination of the non-detection of a carrier of an RF signal at the first frequency is smaller than a maximum count threshold, and wherein further sensing of a carrier of an RF signal at the first frequency is inhibited during a remaining time period of the time interval when the count of determination is equal to the maximum count threshold, and
a second transmitter unit configured to transmit the response signal at the second frequency in response to reception of the information request signal and in response to determination of non-detection by the second receiver unit of a carrier of an RF signal at the second frequency in the first time period.

2. An information access system comprising:
a reader/writer device including:
a first memory,
a first timing generator configured to measure time,
a first transmitter unit configured to transmit an information request signal at a first frequency in a transmission time period,
a first receiver unit configured to receive a response signal at a second frequency which is different from the first frequency, and configured to sense a carrier of an RF signal at the first frequency in a first time period within a non-transmission time period, and
a first control configured to cause the first transmitter unit to suspend its transmission in the non-transmission time period, and to continue the non-transmission time period and cause the first receiver unit to sense a carrier of an RF signal at the first frequency in a second time period after an inactivation time period, in response to detection by the first receiver unit of a carrier of an RF signal at the first frequency in the first time period; and
an information storage device including:
a second memory configured to store an identification,
a second timing generator configured to measure time,
a battery,
a second receiver unit configured to sense a carrier of an RF signal at a first frequency for detection, in a third time period that occurs at time intervals, and further receive the information request signal in response to detection of a carrier of an RF signal at the first frequency, and to sense a carrier of an RF signal at the second frequency in a fourth time period in response to reception of the information request signal,
a second control configured to cause the second receiver unit to sense a carrier of an RF signal at the first frequency for detection, in a fifth time period after a first sleep time period which is shorter than the time interval, in response to determination of non-detection by the second receiver unit of a carrier of an RF signal at the first frequency in the third time period, and to cause the second receiver unit to sense a carrier of an RF signal at the second frequency for detection, in a sixth time period after a second sleep time period which is shorter than the time interval, in response to detection by the second receiver unit of a carrier of an RF signal at the second frequency in the fourth time period, wherein the shorter sleep time period and the subsequent sensing of a carrier of an RF signal at the first frequency are repeated during the time interval unless a carrier of an RF signal at the first frequency is detected as long as a count of determination of the non-detection of a carrier of an RF signal at the first frequency is smaller than a maximum count threshold, and wherein further sensing of a carrier of an RF signal at the first frequency is inhibited during a remaining time period of the time interval when the count of determination is equal to the maximum count threshold, and a second transmitter unit configured to transmit the response signal at the second frequency in response to reception of the information request signal and in response to determination of non-detection by the second receiver unit of a carrier of an RF signal at the second frequency.

3. An information storage device comprising:

a memory configured to store an identification, a timing generator configured to measure time, a battery, a receiver unit configured to sense a carrier of an RF signal at a first frequency for detection, in a first time period that occurs at time intervals, and further receive an information request signal in response to detection of a carrier of an RF signal at the first frequency, and to sense a carrier of an RF signal at a second frequency which is different from the first frequency, in response to reception of the information request signal, a control configured to cause the receiver unit to sense a carrier of an RF signal at the first frequency for detection, in a second time period after a sleep time period which is shorter than the time interval, in response to determination of non-detection by the receiver unit of a carrier of an RF signal at the first frequency in the first time period, wherein the shorter sleep time period and the subsequent sensing of a carrier of an RF signal at the first frequency are repeated during the time interval unless a carrier of an RF signal at the first frequency is detected as long as a count of determination of the non-detection of a carrier of an RF signal at the first frequency is smaller than a maximum count threshold, and wherein further sensing of a carrier of an RF signal at the first frequency is inhibited during a remaining time period of the time interval when the count of determination is equal to the maximum count threshold, and a transmitter unit configured to transmit the response signal at the second frequency in response to reception of the information request signal and in response to determination of non-detection by the receiver unit of a carrier of an RF signal at the second frequency.

4. An information storage device according to claim 3, wherein in response to determination of non-detection by the receiver unit an RF signal at the first frequency in the first time period, the control causes the receiver unit to repeat a combination of a sleep state in the sleep time period and the subsequent carrier sensing of an RF signal at the first frequency in the second time period, up to the maximum count threshold unless a carrier of an RF signal at the first frequency is detected.

5. An information storage device comprising:

a memory configured to store an identification;

a timing generator configured to measure time;

a battery;

a receiver unit configured to sense a carrier of an RF signal at a first frequency for detection, in a first time period that occurs at time intervals, and further receive an information request signal in response to detection of a carrier of an RF signal at the first frequency, and to sense a carrier of an RF signal at a second frequency which is different from the first frequency in a second time period, in response to reception of the information request signal;

a control configured to cause the receiver unit to sense a carrier of an RF signal at the first frequency for detection, in a third time period after a first sleep time period which is shorter than the time interval, in response to determination of non-detection by the receiver unit of a carrier of an RF signal at the first frequency in the first time period, and to cause the receiver unit to sense a carrier of an RF signal at the second frequency for detection, in a fourth time period after a second sleep time period which is shorter than the time interval, in response to detection by the receiver unit of a carrier of an RF signal at the second frequency in the second time period, wherein the shorter sleep time period and the subsequent sensing of a carrier of an RF signal at the first frequency are repeated during the time interval unless a carrier of an RF signal at the first frequency is detected as long as a count of determination of the non-detection of a carrier of an RF signal at the first frequency is smaller than a maximum count threshold, and wherein further sensing of a carrier of an RF signal at the first frequency is inhibited during a remaining time period of the time interval when the count of determination is equal to the maximum count threshold; and a transmitter unit configured to transmit the response signal at the second frequency in response to reception of the information request signal and in response to determination of non-detection by the receiver unit of a carrier of an RF signal at the second frequency.

6. The information storage device according to claim 5, wherein in response to determination of non-detection by the receiver unit of a carrier of an RF signal at the first frequency in the first time period, the control causes the receiver unit to repeat a combination of a sleep state in the first sleep time period and the subsequent carrier sensing of an RF signal at the first frequency in the third time period, up to the maximum count threshold unless a carrier of an RF signal at the first frequency is detected.

7. The information storage device according to claim 5, wherein, in response to detection by the receiver unit of a carrier of an RF signal at the second frequency in the second time period, the control causes the receiver unit to repeat a combination of a sleep state in the second sleep time period and the subsequent carrier sensing of an RF signal at the second frequency in the fourth time period, up to a maximum number of times as long as a carrier of an RF signal at the second frequency is detected.

8. The information storage device according to claim 6, wherein, in response to detection by the receiver unit of a carrier of an RF signal at the second frequency in the second time period, the control causes the receiver unit to repeat a combination of a sleep state in the second sleep time period and the subsequent carrier sensing of an RF signal at the second frequency in the fourth time period, up to a maximum number of times as long as a carrier of an RF signal at the second frequency is detected.

9. A reader/writer device comprising:

a memory;

a timing generator configured to measure time;

a transmitter unit configured to transmit an information request signal at a first frequency in a transmission time period;

a receiver unit configured to receive a response signal at a second frequency which is different from the first frequency, and sense a carrier of an RF signal at the first frequency in a first time period within a non-transmission time period; and a control configured to cause the transmitter unit to suspend its transmission in the non-transmission time period, and, in response to detection by the receiver unit of a carrier of an RF signal at the first frequency in the first time period, continue the non-transmission time period and cause the receiver unit to sense a carrier of an RF signal at the first frequency for detection, in a second time period after an inactivation time period, wherein the inactivation time period and the subsequent sensing of a carrier of an RF signal at the first frequency are repeated during the non-transmission time period when a carrier of an RF signal at the first frequency is detected as long as a count of determination of the detection of a carrier of an RF signal at the first frequency is smaller than a maximum count threshold, and wherein further sensing of a carrier of an RF signal at the first frequency and the transmission are inhibited during a remaining time period of the non-transmission time period when the count of determination is equal to the maximum count threshold.

10. The reader/writer device according to claim 9, wherein in response to detection by the receiver unit of a carrier of an RF signal at the first frequency in the first time period, the control causes the receiver unit to repeat a combination of an inactivation state of operation in the inactivation time period and subsequent carrier sensing of an RF signal at the first frequency in the second time period, up to the maximum count threshold as long as a carrier of an RF signal at the first frequency is detected.

* * * * *